US012608353B2

(12) United States Patent
Olson et al.

(10) Patent No.: US 12,608,353 B2
(45) Date of Patent: *Apr. 21, 2026

(54) DEDUPLICATION ACROSS MULTIPLE DIFFERENT DATA SOURCES TO IDENTIFY COMMON DEVICES

(71) Applicant: The Nielsen Company (US), LLC, New York, NY (US)

(72) Inventors: Rachel Worth Olson, Elk Grove Village, IL (US); Michael Evan Anderson, Chicago, IL (US); Rishi Sriram, Naperville, IL (US); Margaret M. Orton, Chicago, IL (US); Fatemehossadat Miri, Chicago, IL (US); Samantha M. Mowrer, San Francisco, CA (US); David J. Kurzynski, South Elgin, IL (US); Molly Poppie, Arlington Heights, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/961,388

(22) Filed: Nov. 26, 2024

(65) Prior Publication Data

US 2025/0086152 A1    Mar. 13, 2025

Related U.S. Application Data

(63) Continuation of application No. 17/898,058, filed on Aug. 29, 2022, now Pat. No. 12,189,586, which is a continuation of application No. 16/925,961, filed on Jul. 10, 2020, now Pat. No. 11,429,575.

(60) Provisional application No. 62/873,699, filed on Jul. 12, 2019.

(51) Int. Cl.
*G06F 16/215* (2019.01)
*H04N 21/442* (2011.01)

(52) U.S. Cl.
CPC ..... *G06F 16/215* (2019.01); *H04N 21/44222* (2013.01)

(58) Field of Classification Search
CPC ...................... G06F 16/215; H04N 21/44222
USPC ....................................................... 707/692
See application file for complete search history.

(56) References Cited

U.S. PATENT DOCUMENTS

| | | | |
|---|---|---|---|
| 10,187,482 B2 * | 1/2019 | Miller | H04L 67/535 |
| 2017/0126834 A1 * | 5/2017 | Fransen | H04L 67/303 |
| 2019/0108554 A1 * | 4/2019 | Malloy | G06N 7/01 |

* cited by examiner

*Primary Examiner* — Cam Linh T Nguyen

(57) ABSTRACT

Example methods, apparatus, systems and articles of manufacture (e.g., physical storage media) to deduplicate common devices across multiple data sources are disclosed. An example apparatus includes instructions to identify a first device in a first data source and a second device in a second data source as a possible common device, calculate at least one of a station duration metric, a time match metric or a station path metric, the station duration metric, the time match metric based times of day that the first device tuned to a second set of stations and times of day that the second device tuned to the second set of stations, determine a score based on the at least one of the station duration metric, the time match metric, or the station path metric, and determine when the first device and the second device are a common device based on the score.

20 Claims, 9 Drawing Sheets

DEDUPLICATION ACROSS MULTIPLE DIFFERENT DATA SOURCES TO IDENTIFY COMMON DEVICES

CROSS REFERENCE TO RELATED APPLICATIONS

This patent arises from a continuation of U.S. patent application Ser. No. 17/898,058, now U.S. Pat. No. 12,189, 586, which was filed on Aug. 29, 2022, which is a continuation of U.S. patent application Ser. No. 16/925,961, now U.S. Pat. No. 11,429,575, which was filed on Jul. 10, 2020, and is titled "DEDUPLICATION ACROSS MULTIPLE DIFFERENT DATA SOURCES TO IDENTIFY COMMON DEVICES", which claims the benefit of U.S. Provisional Patent Application No. 62/873,699, which was filed on Jul. 12, 2019, and which is titled "IDENTIFICATION OF COMMON DEVICES REPRESENTED IN MULTIPLE DIFFERENT AUDIENCE MEASUREMENT DATA SOURCES." Priority to U.S. patent application Ser. No. 16/925,961 and U.S. Provisional Patent Application No. 62/873,699 is claimed. U.S. patent application Ser. No. 16/925,961 and U.S. Provisional Patent Application No. 62/873,699 are hereby incorporated herein by reference in their entirety.

FIELD OF THE DISCLOSURE

This disclosure relates generally to data deduplication and, more particularly, to identification of common devices represented in multiple different data sources.

BRIEF DESCRIPTION OF THE DRAWINGS

The figures are not to scale. In general, the same reference numbers will be used throughout the drawing(s) and accompanying written description to refer to the same or like parts, elements, etc.

DETAILED DESCRIPTION

Figure 1:
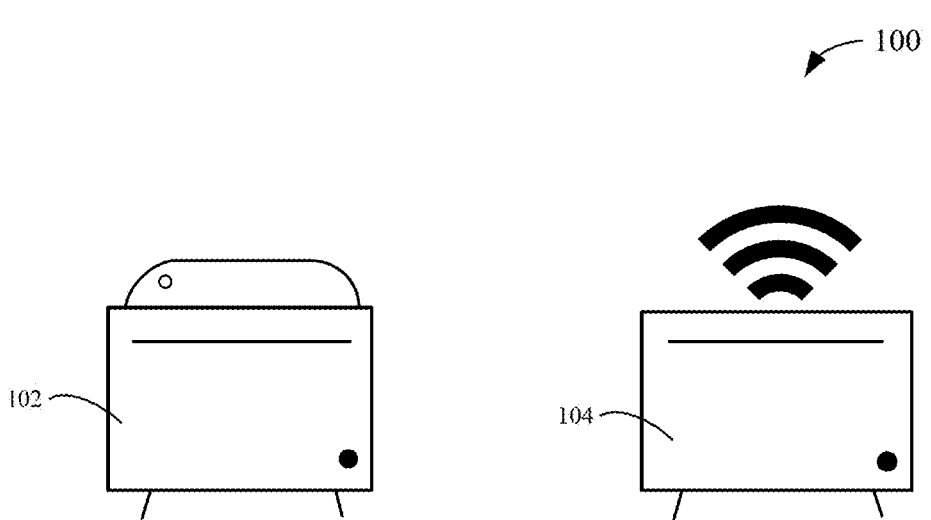
FIG. 1 is a block diagram of an example environment including multiple media presentation devices and multiple audience measurement data sources.
Figure 1:

Example methods, apparatus, systems and articles of manufacture (e.g., physical storage media) for deduplication across multiple different data sources to identify common devices are disclosed herein including, for example, deduplication of data from multiple audience measurement data sources to identify common media presentation devices. As media exposure becomes increasingly fragmented across devices, platforms, and services, audience measurement entities (AME) are working to utilize a wider variety of data sources in television (TV) audience measurement. While statistical panels remain the gold standard, other datasets can provide additional information to supplement or expand measurement. For example, large census or census-like sources, such as set top box and smart TV data, can help stabilize estimates and mitigate sampling error. However, these data sources are of varying levels of quality, and each may have unique challenges based on the techniques through which they collect audience measurement data, such as tuning data, demographic data, etc. To use different data sources appropriately, it is helpful to have a high-quality truth source against which to validate the data sources. Further, if it is possible for data from the same device to appear in multiple sources, deduplication may be needed to avoid double counting of an audience member in the final audience measurement or ratings data.

As used herein, the terms "media," "media content," and/or "media presentation" include any type of content and/or advertisement delivered via any type of distribution medium. Thus, media includes television programming or advertisements, radio programming or advertisements, movies, web sites, streaming media, etc.

Descriptors "first," "second," "third," etc., are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

As used herein a "media device" is a device that retrieves media from a media provider for presentation. In some examples, media devices are capable of directly presenting media (e.g., via a display) while, in other examples, media devices present the media on separate media presentation equipment (e.g., speakers, a display, etc.). Thus, as used herein "media devices" may or may not be able to present media without assistance from a second device. Media devices include consumer electronics. For example, media devices include Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, personal computers, desktop computers, laptop computers, servers, etc.

Monitoring companies (e.g., AMEs) desire knowledge on how users interact with media devices such as smartphones, tablets, laptops, smart televisions, etc. In particular, media monitoring companies want to monitor media presentations made at the media devices to, among other things, monitor exposure to advertisements, determine advertisement effectiveness, determine user behavior, identify purchasing behavior associated with various demographics, etc.

To enable data quality assessments, methodology research and development, validation, and deduplication, a process to identify the same devices appearing in multiple data sources, referred to herein as common devices or devices in common, is useful. By matching devices in common, different audience measurement data sources can be compared side-by-side to understand the differences in the data gathered and/or produced by the different audience measurement data sources. For example, if a panelist's TV set is the same as a TV set associated with audience measurement data from a satellite provider, the tuning data coming from both sources can be assessed to quantify data gaps or other quality concerns. Example common device identification techniques disclosed herein use TV tuning behavior and other characteristics to identify common devices in disparate data sources and to deduplicate the data gathered or derived from a common device. The deduplication results in more accurate audience measurement data.

Disclosed example common device identification techniques match media devices or media presentation devices across data sources based on behavioral similarity. For example, using tuning data, disclosed examples can determine whether the same device is present in multiple data sources. This enables data quality assessments as well as deduplication across data sources, both of which enable the appropriate integration of multiple datasets into audience measurement. Furthermore, if high-quality panel data is available, disclosed example device matching techniques can play a role in vetting data partners, provide foundational validation datasets for methodology development, and facilitate integrating multiple datasets into audience measurement.

Disclosed example common device identification techniques match media devices that are present in multiple data sources by assessing similarity in tuning behavior on those devices. In some disclosed examples, for all possible pairwise device comparisons across data sources, the common device identification techniques compute several metrics, which are combined into an overall score. If the score passes or satisfies a particular threshold, then the devices are classified as a match. Additional restrictions on matches, such as requiring devices to come from the same geographical area, can also be included to use additional matching criteria and also to decrease the number of comparisons for scalability. Disclosed example techniques enable comparisons of large numbers of devices. For example, 50,000 media devices may be represented in panelist audience measurement data and 2,000,000 media devices may be represented in census audience measurement data, resulting in $10^{11}$ (i.e., 100,000,000,000) possible pairwise comparisons. Panelists are users registered on panels maintained by a ratings entity (e.g., an AME) that owns and/or operates the ratings entity subsystem. Panelist audience measurement data includes data gathered and/or derived from these users.

A census includes collection of information across large or broad segments of the population. Census audience measurement data includes data gathered and/or derived from a broader segment of the population at large (rather than just registered panelists). As noted above, census-like sources include set top boxes and smart TVs. As used herein, "census" and "census data" includes a portion of a population but not necessarily every member of a population.

As disclosed herein, example metrics that can be used for common device identification capture different aspects of tuning behavior including the media (e.g., content, advertisement, etc.) tuned, time of tuning events, and sequence of tuning events. Example metrics disclosed herein can be used to determine if there is a sufficient, desired, and/or threshold degree of similarity between what media two devices associated with two different audience measurement datasets were presenting (e.g., based on one or more thresholds), when the two devices were presenting media, the order in which events (e.g., tuning events) occurred, etc., for the two devices to be identified as the same device (e.g., a common device) appearing in multiple data sources. However, because the data quality can differ across data sources, the metrics can allow for some degree of difference, which may also vary depending on the data source. For example, some data sources may be more prone to missing information and/or containing errors associated with capturing the exact timing of tuning events. For this reason, the disclosed example deduplication and common device identification techniques are flexible such that the metrics and respective thresholds for matching device activity can be adjusted based on known information and/or limitations of the datasets being compared.

Unlike prior techniques for identifying common devices among multiple datasets, disclosed example techniques do not detect matches by relying on device identification information such as, for example, device model and/or serial numbers. Rather, disclosed example deduplication and common device identification techniques compare tuning behavior across the datasets, for example, media presentation information (e.g., channel/station identifiers, program identifiers, etc.), timing and sequencing of tuning events, duration of tuning events, etc., to identify common devices across the datasets. Furthermore, disclosed example deduplication and common device identification techniques are nuanced as these techniques include metrics that assess different aspects of tuning behavior, which can be optimized based on known qualities of the data sources under evaluation, thereby allowing the disclosed examples to be applied to a wide variety of use cases.

Turning to the figures, FIG. 1 shows an example environment 100 in which there are multiple data measurement sources including an audience measurement entities (AME) meter 102 and an automatic content recognition (ACR) meter 104. In this example, the AME meter 102 measures panelist audience measurement data, which includes data indicative of the media presented by the media devices (e.g., televisions) at panelists sites. In this example, the ACR meter 104 measures census data, which includes data reported by software clients executed by the media devices (e.g., smart TVs). Though two example data sources, the AME meter 102 and the ACR meter 104, are shown in the example environment 100 of FIG. 1, in other examples, other numbers of data sources may be included. The AME meter 102 gathers data from one or more first devices 108. The ACR meter 104 gathers data from one or more second devices 110. In some examples, the first devices 108 and the second devices 110 are the same. In some examples, the first devices 108 and the second devices 110 partially overlap. In some examples, the first devices 108 and the second devices 110 are disparate. The examples disclosed herein facilitate the identification of common devices between the first devices 108 and the second devices 110 that are represented in both panelist audience measurement data and census audience measurement data reported by media devices. The example disclosed herein facilitate deduplication of data related to common devices to enhance the accuracy of audience measurement data.

Figure 2:
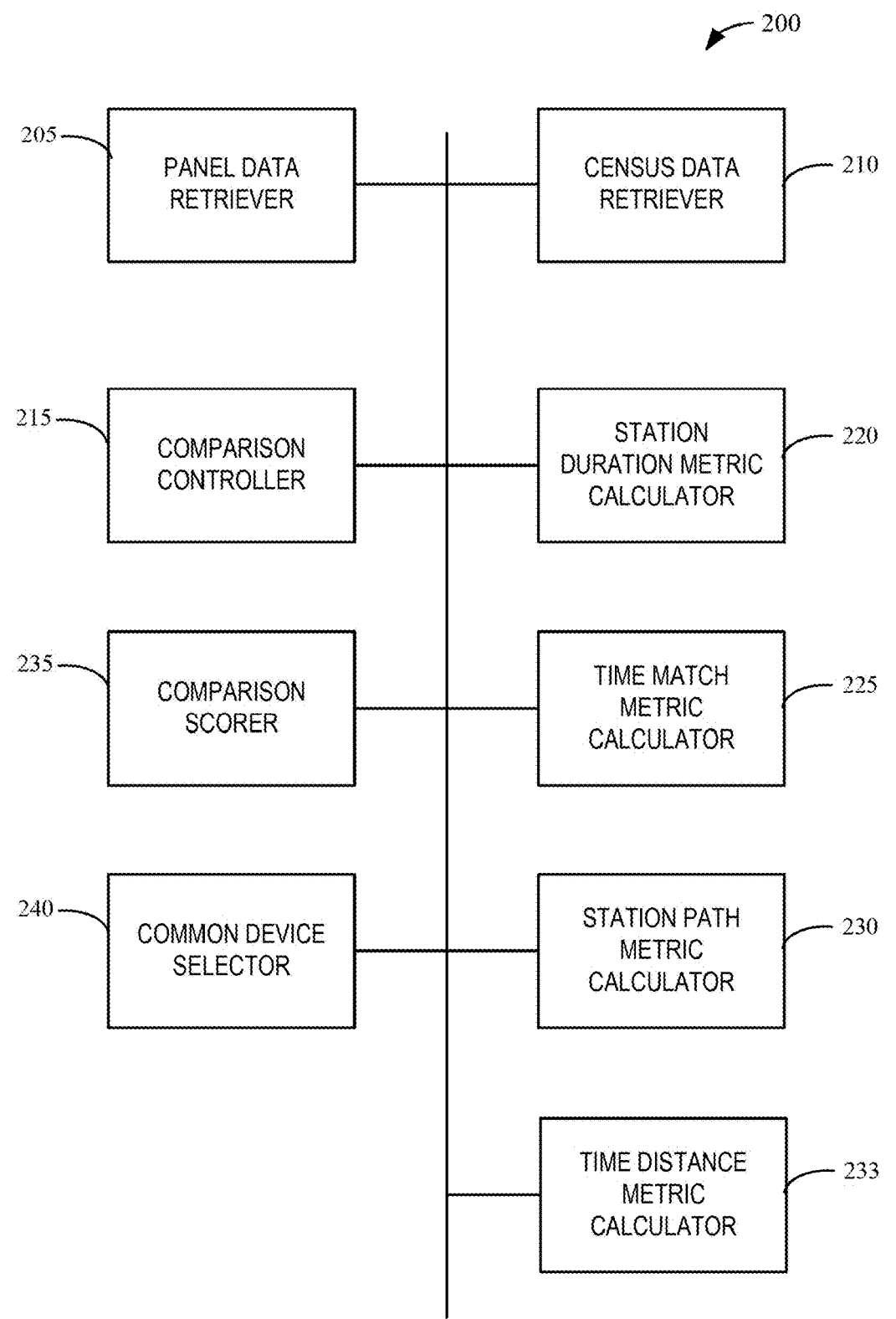
FIG. 2 illustrates a block diagram of an example common device identification system implemented in accordance with teachings of this disclosure.

FIG. 2 illustrates a block diagram of an example common device identification system 200 implemented in accordance with teachings of this disclosure. The common device identification system 200 of the illustrated example includes an example panelist data retriever 205, an example census data retriever 210, an example comparison controller 215, an example station duration metric calculator 220, an example time match metric calculator 225, an example station path metric calculator 230, an example time distance metric calculator 233, an example comparison scorer 235 and an example common device selector 240.

In some examples, the panelist data retriever 205 retrieves, via one or more networks, panelist audience measurement data reported by AME meter 102. In some examples, the census data retriever 210 retrieves, via one or more networks, census audience measurement data reported by ACR meter 104 (e.g., smart TVs and/or other media devices). In some examples, the panel data retriever 205 and the census data retriever 210 are combined. In other examples, there are additional data retrievers such as, for example, if there are additional meters and/or other data sources in the environment 100.

In some examples, the comparison controller 215 identifies homes that include multiple data sources including, for example two meters. For example, the comparison controller 215 determines AME panel households that include ACR meters such as an ACR meter included in a smart TV. The comparison controller 215 is to identify a first device in a first data source and a second device in a second data source as a possible common device. For example, the comparison controller 215 can compare tuning data collected from the two data sources to match devices with similar tuning data. In some examples, the comparison controller 215 can examine minute-level and sub-minute level tuning. In some examples other time periods may be used. In some examples, the comparison controller 215 can pinpoint data quality concerns such as, for example, missing and/or mis-credited tuning data.

In some examples, the comparison controller 125 is to apply a restriction to first data from the first data source and second data from the second data source before the comparison controller is to identify the first device and the second device as the possible common device. For example, the comparison controller 215 may limit pairwise comparison of devices represented in the panelist data versus the census data based on geographic locations of the devices, such as by limiting comparison of devices to pairs of devices in the same designated market area (DMA).

The comparison controller 215 configures the station duration metric calculator 220, the time match metric calculator 225, the station path metric calculator 230, an example time distance metric calculator 233, the comparison scorer 235, and the common device selector 240 to perform a first comparison iteration (e.g., a first pass) based on the data from the two data sources to select candidate matches of pairs of devices across the two datasets. For example, the comparison controller 215 can configure a first comparison of panelist audience measurement data and census audience measurement data corresponding to a first time interval. In some examples, the first time interval is one day, one week, or some other duration.

The comparison controller 215 also configures the station duration metric calculator 220, the time match metric calculator 225, the station path metric calculator 230, an example time distance metric calculator 233, the comparison scorer 235, and the common device selector 240 to perform a second comparison iteration (e.g., a second pass) limited to the candidate matches identified in the first comparison iteration. The second comparison iteration is based on the data from the two data sources. For example, the second comparison iteration is based on panelist audience measurement data and census audience measurement data corresponding to a second time interval. In some examples, the second interval is broader or longer than the first interval. In some examples, the second interval is one month, six weeks, or some other duration. In some example, the comparison controller 215 determines candidate common devices based on the first comparison iteration and/or the second comparison iteration.

In some examples, a first calculator such as, for example, the station duration metric calculator 220, calculates a station duration metric to compare a pair of media devices (e.g., one media device represented in the panelist audience measurement data with another media device represented in the census audience measurement data). The station duration metric is based on first station duration data and second station duration data. The first station duration data is associated with a first set of durations of time that the first device tuned to a set of stations. The second station duration data is associated with a second set of durations of time that the second device tuned to the set of stations. In some examples, the first station duration data relates to data from the first data source, and the second station duration data relates to data from the second data source. The station duration metric d(p,q) measures whether the two media devices being compared presented media from the same stations in similar amounts over a comparison duration (e.g., one week for the first pass, six weeks for the second pass).

In some examples, the station duration metric calculator 220 is to calculate the first station duration, $q_i$:

$$q_i = \log_{10}(ith \text{ channel duration for device 1}) \qquad \text{Equation (1)}$$

The station duration metric calculator 220 also is to calculate the second station duration, $p_i$:

$$p_i = \log_{10}(ith \text{ channel duration for device 2}) \qquad \text{Equation (2)}$$

In some examples, the station duration metric calculator 220 uses the logarithm function to desensitize the duration comparison to focus on similarities on an order of magnitude, rather than an exact value. In some examples, the station duration metric calculator 220 calculates a normalized distance score. For example, the station duration metric calculator 220 computes a normalized Euclidean distance score by:

$$d(p, q) = d(q, p) = \sqrt{\sum_{i=1}^{n} (q_i - p_i)^2} \qquad \text{Equation (3)}$$

-continued $$\frac{d(p, q)}{N^{0.75}}$$ Equation (4)

where N is the number of stations. Accounting for the number of stations tuned in the denominator ensures that devices tuning to a small number of stations do not carry disproportionately high weight in the calculation. The station duration metric calculator 220 sets the normalized distance score as the station duration metric. The factor $N^{0.75}$ is a normalization factor and, in some examples, the value 0.75 is configurable. In the illustrated example, a lower station duration metric indicates a closer match. That is, the lower the station duration metric, the more likely the two devices are a common device.

In some examples, a second calculator such as, for example, the time match metric calculator 225 calculates an example time match metric. The time match metric calculator 225 compares data related to a pair of media devices (e.g., one media device represented in the panelist audience measurement data with another media device represented in the census audience measurement data). The time match metric measures whether the two media devices being compared presented the same media at the same times. The time match metric is based on first time data and second time data. The first time data is associated with a first set of times of day that the first device tuned to a set of stations. The second time data is associated with a second set of times of day that the second device tuned to the set of stations. In some examples, the first set of times of day overlap with the second set of times of day. In some example, the set of stations related to the data compared by the time match metric calculator 225 is the same as the set of stations related to the data compared by the station duration metric calculator. In some example, the set of stations related to the data compared by the time match metric calculator 225 and the set of stations related to the data compared by the station duration metric calculator at least partially overlap. In some example, the set of stations related to the data compared by the time match metric calculator 225 is wholly disparate from the set of stations related to the data compared by the station duration metric calculator.

In some examples, the time match metric calculator 225 divides the first set of times of day and the second set of times of day into time slots. For example, the time match metric calculator 225 divides the comparison duration (e.g., one week for the first pass, six weeks for the second pass, etc.) into time slots. In some examples, the time slots are an hour in duration. In some examples, the time slots are in half-hour increments. Other examples may use other durations for the time slots and/or a combination of different durations.

The time match metric calculator 225 identifies a dominant station tuned to by the different devices for respective time slots. In some examples, the time match metric calculator 225 identifies the dominant station tuned to by each of the devices for each of the time slots. For example, the time match metric calculator 225 may determine the dominant station based on a duration of tuning to the station, the station tuned to for the most amount of aggregate time in a time slot, and/or the station tuned to for the longest contiguous time duration. In some examples, the time match metric calculator 225 identifies from the respective panelist versus census audience measurement data for each device being compares, the dominant station tuned by each device during each time slot. For example, with two slots, the time match metric calculator 225 identifies a first dominant station tuned to by the first device in a first time slot of the time slots, identifies a second dominant station tuned to by the second device in the first time slot, identifies a third dominant station tuned to by the first device in a second time slot of the time slots, and identifies a fourth dominant station tuned to by the second device in the second time slot. In some examples, the first and second device may be the same device. In such an example, and with two time slots, the time match metric calculator 225 identifies a first dominant station tuned to by the device in a first time slot of the time slots based on a first data source (e.g., the panelist data), identifies a second dominant station tuned to by the device in the first time slot based on a second data source (e.g., the census data), identifies a third dominant station tuned to by the device in a second time slot of the time slots based on the first data source, and identifies a fourth dominant station tuned to by the device in the second time slot based on the second data source.

In some examples, the time match metric calculator 225 compares the dominant stations in respective time slots. In some examples, the time match metric calculator 225 compares the dominant stations in each time slot. For example, with the example of two time slots, the time match metric calculator 225 performs a first comparison of the first dominant station and the second dominant station of the first time slot, and performs a second comparison of the third dominant station and the fourth dominant station.

In some examples, the time match metric calculator 225 calculates a penalty based on the comparison of dominant stations in a time slot. In some examples, the time match metric calculator 225 sets a penalty at a first value when at least one of: (1) data for the respective time slot is missing from at least one of the first device or the second device, or (2) at least one of the first device or the second device is powered off for the respective time slot. The time match metric calculator 225 sets a penalty at a second value when the first device and the second device are tuned to different stations during a respective time slot. In some examples, the second value is greater than the first value. Thus, the time match metric calculator 225 determines different penalties to assign to a time slot based on the power status and/or tuning status of the device. Thus, the time match metric calculator 225 determines different penalties to assign to a time slot based on whether the dominant stations between two devices (or data sources) match, one device is powered off, one device is tuning and lacks a dominant station, both devices are powered off, etc. For example, if the stations tuned by the pair of devices match during a time slot, no penalty is assigned (e.g., penalty=0). If both devices are off, a penalty value (e.g., 0.5) is assigned. If there is a mismatch, a penalty value is assigned, which can be dependent on the type of mismatch. In some examples, the penalty values are between 0 and 1. In some examples, penalty factors are alternatively or additionally based on the data sources being compared. For example, some data sources have excess tuning compared to other data sources. In such examples, a different penalty may be applied to mismatches with comparisons using those data sources.

In the illustrated example, the time match metric calculator 225 sums the penalty values for respective time slots over the given comparison duration, and divides by the number of timeslots to determine the time match metric for that pair of devices. In some examples, the time match metric calculator 225 sums the penalty values for all time slots over the given comparison duration. The time match metric calculator 225 determines a difference score based on the sum of the penalties. The term "difference" score is to signify a level of difference between the two devices, i.e., how different the devices are. The time match metric calculator 225 sets the difference score as the time match metric. In the illustrated example, a lower time match metric indicates a closer match. That is, the lower the time match metric, the more likely the two devices are a common device.

In some examples, a third calculator such as, for example, the station path metric calculator 230 calculates an example station path metric. The station path metric calculator 230 determines the station path metric to compare a pair of media devices (e.g., one media device represented in a first data source such as, for example, the panelist audience measurement data with another media device represented in a second data source such as, for example, the census audience measurement data). The station path metric measures whether the two media devices being compared presented the same sequence of media. Thus, in some examples, the station path metric is based on a first sequence of stations tuned to by the first device and a second sequence of stations tuned to by the second device.

In the illustrated example, the station path metric calculator 230 computes an edit distance between the sequence of stations tuned by the first device and the sequence of stations tuned by the second device over a comparison duration (e.g., one week for the first pass, six weeks for the second pass). The edit distance counts the number of changes that would be needed for the sequence tuned by the first device to match the sequence tuned by the second device. In other words, the station path metric calculator 230 determines a number of operations needed to transform the second sequence tuned to by the second device into the first sequence tuned to by the first device (or vice versa). In the illustrated example, the station path metric calculator 230 determines the station path metric based on the number of operations.

In some examples, the station path metric calculator 230 is to compute a Levenshtein distance to determine the number of operations or the distance between two station sequences. For example:

$$lev_{a,b}(i, j) =$$

$$\begin{cases} \max(i, j) & \text{if } \min(i, j) = 0, \\ \min \begin{cases} lev_{a,b}(i-1, j) + 1 \\ lev_{a,b}(i, j-1) + 1 \\ lev_{a,b}(i-1, j-1) + 1_{(a_i \neq b_j)} \end{cases} & \text{otherwise.} \end{cases}$$

Equation (5)

In the illustrated example, the number of operations or edit distance determined by the station path metric calculator 230 is normalized by the lengths of the tuning sequences of both devices to determine the station path metric for the pair of devices being compared. In the illustrated example, a lower station path metric indicates a closer match. That is, the lower the station path metric, the more likely the two devices are a common device.

In some examples, a fourth calculator such as, for example, the time distance metric calculator 233 calculates an example time distance metric. The time distance metric measures or quantifies how similar the start and/or end times of tuning sessions or tuning activities are between two devices. The times discussed with respect to the time distance metric calculator 233 could be either the start times or the end times of the tuning sessions or, in some examples. Could be both start times and end times that are then combined. The time distance metric measures whether the two media devices being compared presented media at the same times. Thus, in some examples, the time distance metric is based on tuning or time events of the first device and the second device.

In the illustrated example, the time distance metric calculator 233 identifies a first set of time events for the first device and creates a first list of the time events. The first list of the time events may be, for example, unix timestamps, which are integer numbers of seconds from some reference point. For example, a first list may include [10, 15, 20]. In this example, the first device had a first time event 10 seconds after the reference point. The first time event could be powering on the first device, tuning to a channel, or other change in operation of the first device. The first device, in this example, has a second time event at fifteen seconds past the reference point and a third time event at twenty seconds past the reference point. The time distance metric calculator 233 identifies a second set of time events for the second device and creates a second list of the time events. The second list of the time events also may be, for example, unix timestamps. For example, a second list may include [10, 12, 16, 19, 20].

The time distance metric calculator 233 determines the length of each list of time events. In some examples, the two lists of time events are not same length. In such examples, the shorter list may be known as the short list, and the longer list may be known as the long list. Thus, in the example above, the lists could be identified as short=[10, 15, 20] and long=[10, 12, 16, 19, 20]. In some examples, the lengths of the two lists are the same. The time distance metric calculator 233 determines the absolute distance between each event in each of the two lists. For example, the time distance metric calculator 233 may use an array to determine the absolute time distance between the events:

|     | 10 | 12 | 16 | 19 | 20 |
| --- | --- | --- | --- | --- | --- |
| 10 | 0 | 2 | 6 | 9 | 10 |
| 15 | 5 | 3 | 1 | 4 | 5 |
| 20 | 10 | 8 | 4 | 1 | 0 |

Thus, in this example, the first device had a time event at 10 seconds, and the second device had a time event at 10 seconds. Therefore, the distance between the two time events is 0. The first device had a second event at 15 seconds. The second device has a second event at 12 seconds. Therefore, the distance between the two time events is 3. The time distance metric calculator 233 also determines the distance between different ones of the time events. For example, the distance between the first time event of the first device (at 10 seconds) and the third time event of the second device (at 16 seconds) is 6. The time distance metric calculator 233 determines the distances between all of the time events between the two devices.

The time distance metric calculator 233 determines a minima distance list, which is a list of scores or distances that represent how close the events in the list are. When there is one list shorter than the other, the time distance metric calculator 233 determines the minimum distance for each item in the short list (i.e., each row in the array). This is the minimum distance for an event in the short list to one of the events in the long list. In the example above, the time distance metric calculator 233 determines the minima distance as short_list_minima=[0 1 0]. In the example in which the lists are of the same length, the time distance metric calculator 233 determines the minimum distance from one of the lists to the other.

In the example above, there is a short list and a long list. Thus, there are additional items in the long list that did not match to an item in the short list when the time distance metric calculator 233 determined the minima distance. For example, the second time event of the second device at 12 seconds and the fourth time event of the second device at 19 seconds did not match to an event of the first device when determining the minima distance. In this scenario, the time distance metric calculator 233 adds a penalty value. In some examples, the penalty value is the greatest distance possible between two timestamps in the time period. For example, in a seven-day time period, the penalty may be 604,800 (7 days=7 days*24 hours*60 minutes*60 seconds). In some examples, the time distance metric calculator 233 calculates:

$$all\_penalties = short\_list\_minima + [penalty] * (len(\text{long}) - \quad \text{Equation (6)}$$

$$len(\text{short})) = [0, 1, 0, penalty, penalty]$$

where len represents the name of the length function in Python, which is the number of elements in the list. In the example above, the number of elements in the short list is three, and the number of elements in the long list is five.

The time distance metric calculator 233 computes a final time distance score as the root mean square of these values. For example:

$$final\ time\ distance\ score = mean([x^2\ for\ x\ in\ all\_penalties])^{0.5}$$

In the example above, the final time distance score would be 382509.10577422864. In the illustrated example, a lower time distance metric indicates a closer match. That is, the lower the time distance path metric, the more likely the two devices are a common device.

In some examples, the comparison scorer 235 determines a final comparison or joint score based on the station duration metric, the time match metric, the station path metric, and the time distance metric. In some examples, the comparison scorer 235 standardizes the station duration metric, the time match metric, the station path metric, and/or the time distance metric. For example, the comparison scorer 235 computes the z-score of the station duration metric, the z-score of the time match metric, the z-score of the station path metric, the z-score of the time distance metric. In the illustrated example, the comparison scorer 235 determines the joint score based on a combination (e.g., a sum) of the z-score of the station duration metric, the z-score of the time match metric, the z-score of the station path metric, and the z-score of the time distance metric.

The common device selector 240 uses the resulting joint scores to select pairs of devices that are candidate common devices during the first iteration pass, or are identified common devices during the second iteration pass. In some examples, the common device selector determines that the first device and the second device are a common device when the joint score satisfies a threshold. In some examples, the threshold is satisfied when four times the standard deviation of the joint score is less than the mean joint score. In some examples, the common device selector 240 determines that two devices are a common device, when the joint score satisfies the threshold for the first iteration pass and again for the second iteration pass.

In some examples, the common device selector 240 outputs final selections of the common devices that are represented in both sources of data. For example, the common device selector 240 determines or selects common device based on the panelist audience measurement data and census audience measurement data. In some examples, the common device selector 240 deduplicates data in the one or more of the first data source and/or the second data source based on the determination that two devices are common devices. Further details concerning the other elements of FIG. 2 are provided in connection with the descriptions of FIGS. 3-8 provided below.

The examples disclosed herein calculate or otherwise determine the station duration metric, the time match metric, the station path metric, and/or the time distance metric. In some examples, the common device identification system 200 uses one, two, or three of these metrics to identify devices in common. In other examples, the common device identification system 200 uses all four metrics to identify devices in common. Also, in some examples other metrics may alternatively or additionally be used to identify devices in common. Also, in some examples, one or more of the elements of one or more of the algorithms to determine one or more of the metrics may change. For example, the penalties to determine the time match metric and/or the time distance metric are adjustable.

In the Illustrated example of FIG. 2, the panelist data retriever 205 and/or the census data retriever 210 include means for retrieving, interacting, and/or accessing data from other components of a processing device. In this example, the accessing means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the panelist data retriever 205 and/or the census data retriever 210 implements the accessing means.

In the Illustrated example of FIG. 2, the comparison controller 215 includes means for identifying a device in a data source. In this example, the identifying means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the comparison controller 215 implements the identifying means.

In the Illustrated example of FIG. 2, the comparison controller 215 includes means for identifying a device in a data source. In this example, the identifying means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the comparison controller 215 implements the identifying means.

In the Illustrated example of FIG. 2, the station duration metric calculator 220 includes means for calculating a station duration metric based on station duration data associated with durations of time a device was tuned to a set of stations. In this example, the calculating means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the station duration metric calculator 220 implements the means for calculating a station duration metric.

In the Illustrated example of FIG. 2, the time match metric calculator 225 includes means for calculating a time match metric based on time data associated with a set of times of day that a device tuned to a set of stations. In this example, the calculating means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the time match metric calculator 225 implements the means for calculating a time match metric.

In the Illustrated example of FIG. 2, the station path metric calculator 230 includes means for calculating a station path metric based on a sequence of stations tuned to by a device. In this example, the calculating means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the station path metric calculator 230 implements the means for calculating a station path metric.

In the Illustrated example of FIG. 2, the time distance metric calculator 233 includes means for calculating a time distance metric based on the start and/or end times of viewing sessions. In this example, the calculating means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the time distance metric calculator 233 implements the means for calculating a time distance metric.

In the Illustrated example of FIG. 2, the comparison scorer 235 includes means for determining a joint score based on the station duration metric, the time match metric, and the station path metric. In this example, the determining means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the comparison controller 215 implements the determining means.

In the Illustrated example of FIG. 2, the common device selector 240 includes means for selecting when the first device and the second device are a common device and means for deduplicating one or more data sources. In this example, the selecting means and/or deduplication means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the comparison controller 215 implements the selecting means and/or deduplication means.

While an example manner of implementing the example common device identification system 200 is illustrated in FIG. 2, one or more of the elements, processes and/or devices illustrated in FIG. 2 may be combined, divided, re-arranged, omitted, eliminated and/or implemented in any other way. Further, the example panel data retriever 205, the example census data retriever 210, the example comparison controller 215, the example station duration metric calculator 220, the example time match metric calculator 225, the example station path metric calculator 230, the example time distance metric calculator 233, the example comparison scorer 235, the example common device selector 240, and/or more generally, the example common device identification system 200 of FIG. 2 may be implemented by hardware, software, firmware and/or any combination of hardware, software and/or firmware. Thus, for example, any of the example panel data retriever 205, the example census data retriever 210, the example comparison controller 215, the example station duration metric calculator 220, the example time match metric calculator 225, the example station path metric calculator 230, the example time distance metric calculator 233, the example comparison scorer 235, the example common device selector 240, and/or the example common device identification system 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, panel data retriever 205, the example census data retriever 210, the example comparison controller 215, the example station duration metric calculator 220, the example time match metric calculator 225, the example station path metric calculator 230, the example time distance metric calculator 233, the example comparison scorer 235, the example common device selector 240, and/or the example common device identification system 200 is/are hereby expressly defined to include a non-transitory computer readable storage device or storage disk such as a memory, a digital versatile disk (DVD), a compact disk (CD), a Blu-ray disk, etc. including the software and/or firmware. Further still, the example common device identification system 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the common device identification system 200 of FIG. 2 are shown in FIGS. 3-8. The machine readable instructions may be one or more executable programs or portion(s) of an executable program for execution by a computer processor and/or processor circuitry, such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 3-8, many other methods of implementing the example common device identification system 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 3:
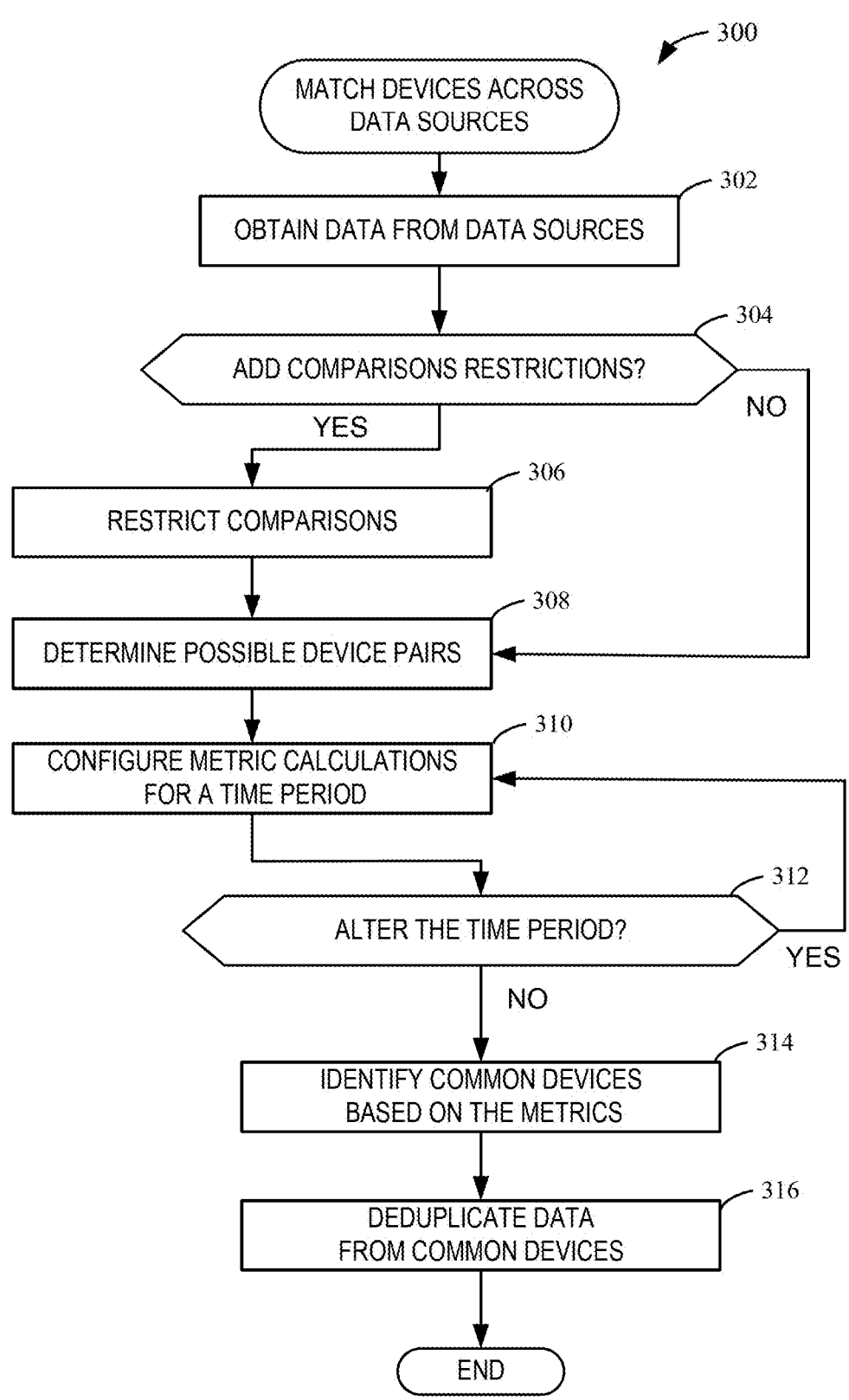
FIGS. 3-8 illustrated flowcharts representative of example machine readable instructions that may be executed to implement the example common device identification system of FIG. 2.

FIG. 3 illustrates an example procedure or program 300 to be performed by the example system 200 of FIG. 2 to match devices across data sources such as, for example, a panelist audience measurement data source and a census audience measurement data source. The example program 300 includes the panelist data retriever 205 retrieving, accessing, or obtaining panelist audience measurement data and the census data retriever 210 retrieving, accessing, or obtaining census audience measurement data (block 302). In other examples, other types of data from other data sources may alternatively or additionally be retrieved, accessed, or obtained. The comparison controller 215 determines if there are comparison restrictions to be implemented (block 304). The comparison restrictions limit the amount of data from the data sources to be analyzed. For example, the comparison controller 215 may limit pairwise comparison of devices represented in the panelist data versus the census data based on geographic locations of the devices, such as, for example, by limiting comparison of devices to pairs of devices in the same designated market area (DMA). Adding comparison restrictions reduces the computing resources needed to identify common devices and increases the speed at which common devices can be identified. If the comparison controller 215 determines that there are comparison restrictions to be implemented (block 304: YES), then the comparison controller 215 restricts the comparisons (block 306).

If the comparison controller 215 determines that there are no comparison restrictions to be implemented (block 304: NO) and/or with comparison restrictions implements (block 306), the comparison controller 215 identifies possible device pairs (block 308). In some examples, the comparison controller 215 randomly selects two devices to investigate as possible pairs. In some examples, the comparison controller 215 selects two devices to investigate as possible pairs based on geography. In some examples, the comparison controller 215 selects two devices to investigate as possible pairs based on an IP address or a range of IP addresses. In some examples, the comparison controller 215 selects two devices to investigate as possible pairs based on a demographic category associated with the devices. In some examples, the comparison controller 215 selects two devices to investigate as possible pairs based on device tuning activity such as, for example, a broad or coarse overview of the tuning activity. For example, the comparison controller 215 could identify one, two, or more tuning events that match between two devices. In some examples, the comparison controller 215 selects two devices to investigate as possible pairs based on a pattern of the devices being powered on or off. In some examples, the comparison controller 215 selects two devices to investigate as possible pairs based on other device activity.

The comparison controller 215 configures metric calculations for a time period (block 310). For example, the comparison controller 215 configures the station duration metric calculator 220, the time match metric calculator 225, the station path metric calculator 230, the time distance metric calculator 233, the comparison scorer 235 and the common device selector 240 to perform a first comparison iteration (e.g., a first pass) based on panelist audience measurement data and census audience measurement data corresponding to a first time interval (e.g., such as one week, or some other duration) to select candidate matches of pairs of devices across the two datasets.

The comparison controller 215 determines if the time period should be altered (block 312). For example, the comparison controller 215 determines if another time period such as, for example, a longer or broader time period should be studied to identify common devices. If the comparison controller 215 determines the time period should be altered (block 312: YES), then the comparison controller 215 configures metric calculations for a time period (block 310). For examples, the comparison controller 215 configures the station duration metric calculator 220, the time match metric calculator 225, the station path metric calculator 230, the time distance metric calculator 233, the comparison scorer 235 and the common device selector 240 to perform a second comparison iteration (e.g., a second pass) limited to the candidate matches and based on panelist audience measurement data and census audience measurement data corresponding to a second (e.g., longer) time interval (e.g., such as six weeks, or some other duration). The comparison controller 215 again determines if the time period should be altered (block 312). For example, the comparison controller 215 determines if another time period such as, for example, a longer time period or shorter time period should be studied to identify common devices.

If the comparison controller 215 determines if the time period should be not be altered (block 312: NO), the program 300 continues with the processing the derived metrics. For example, the common device selector 240 identifies common devices based on the metrics (block 314). For example, based on the metrics derived from the station duration metric calculator 220, the time match metric calculator 225, the station path metric calculator 230, the time distance metric calculator 233, the common device selector 240 identifies devices that are represented in both sources of data (the panelist audience measurement data and census audience measurement data). The common device selector 240 deduplicates data from common devices (block 316). The example program 300 then ends.

Figure 4:
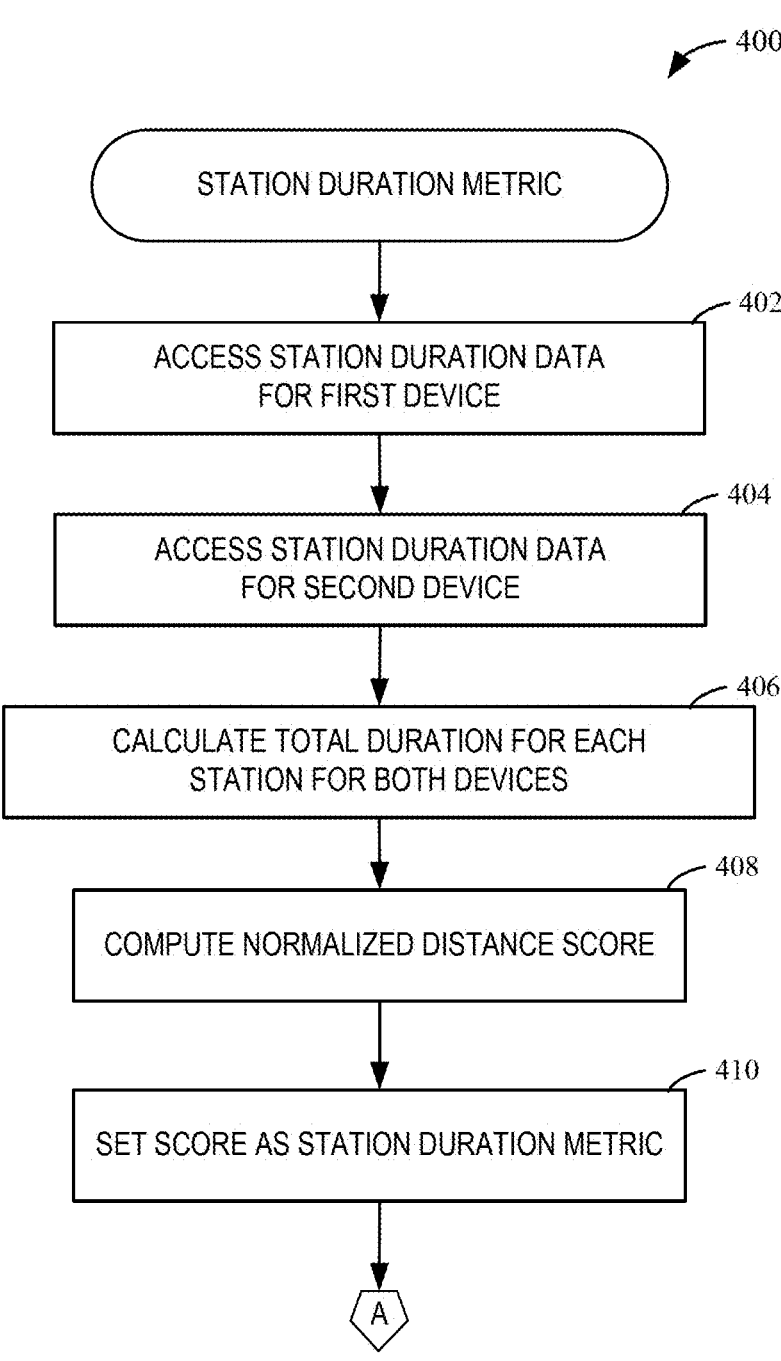

FIG. 4 illustrates an example procedure or program 400 to be performed by the station duration metric calculator 220 to determine an example station duration metric. The station duration metric is used to compare a pair of media devices (e.g., one media device represented in the panelist audience measurement data with another media device represented in the census audience measurement data). The station duration metric $d(p,q)$ measures whether the two media devices being compared presented the media from the same stations in similar amount over a comparison duration (e.g., one week for the first pass, six weeks for the second pass).

The example program 400 includes the station duration metric calculator 220 accessing station duration data for a first device (block 402) and station duration data for a second device (block 404). The station duration metric calculator 220 calculates a total duration for each station for both devices (block 406). For example, the station duration metric calculator 220 calculates the total duration for each station for both devices using Equation (1) and Equation (2). The station duration metric calculator 220 calculates or computes a normalized distance score for the two sets of station duration data from the two devices (block 408). For example, the station duration metric calculator 220 computes a normalized distance score using Equation (3) and Equation (4). The station duration metric calculator 220 sets the normalized distance score as the station duration metric A (block 410). The station duration metric A is used to identify if two devices are common devices as disclosed herein.

Figure 5:
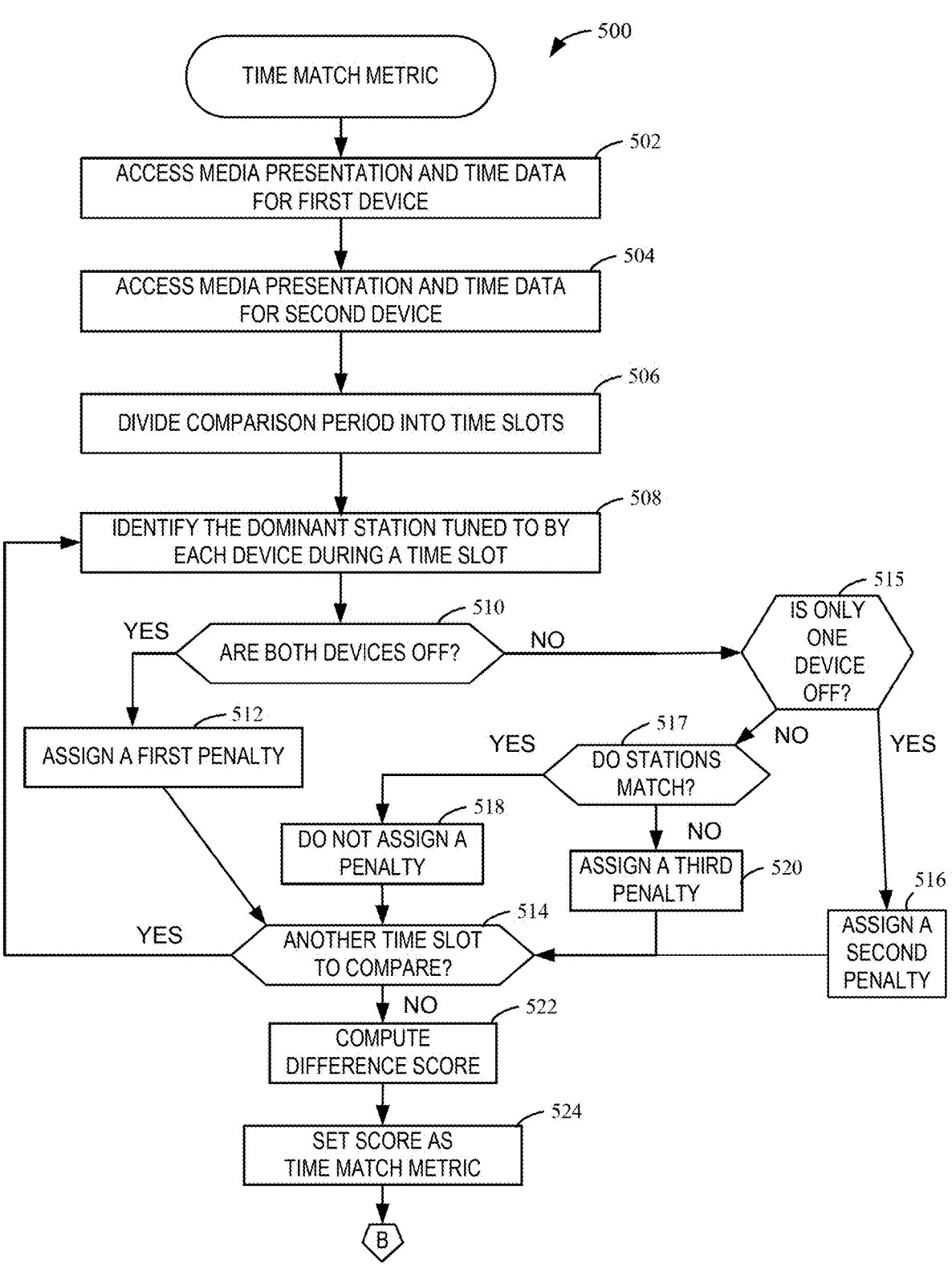

FIG. 5 illustrates an example procedure or program 500 to be performed by the time match metric calculator 225 to determine an example time match metric. The time match metric is used to compare a pair of media devices (e.g., one media device represented in the panelist audience measurement data with another media device represented in the census audience measurement data). The time match metric measures whether the two media devices being compared presented the same media at the same times.

In the illustrated example program 500, the time match metric calculator 225 accesses media presentation and time data for a first device (block 502) and accesses media presentation and time data for a second device (block 504). The media presentation and time data correspond to times of day during which the respective devices were tuned to media (e.g., a set of stations). The time match metric calculator 225 divides the comparison period (e.g., one week for the first pass, six weeks for the second pass) into time slots (block 506). The time slot duration may be the same or different for different comparison periods.

The time match metric calculator 225 identifies the dominant station tuned to by each device during a time slot (block 508). For example, the time match metric calculator 225 may determine the dominant station based on a duration of tuning to the station. In some examples, the dominant station is the station tuned to for the most amount of aggregate time in a time slot. In some examples, the dominant station is the station tuned to for the longest contiguous time duration. The time match metric calculator 225 determines if both devices are powered off during a time slot (block 510). If both devices are powered off during a time slot (block 510: YES), the time match metric calculator 225 assigns a first penalty (block 512). For example, a penalty of 0.5 may be applied. Any value may be used. In some examples, the penalty values are between 0 and 1. The time match metric calculator 225 then determines if another time slot is to be compared (block 514). If another time slot is to be compared (block 514: YES), the time match metric calculator 225 identifies the dominant station tuned to by each device during the time slot to be compared (block 508).

If both devices are not powered off during a time slot (block 510: NO), the time match metric calculator 225 determines if only one of the devices is powered off during a time slot (block 515). If one of the devices is powered off during a time slot (block 515: YES), the time match metric calculator 225 assigns a second penalty (block 516). For example, a penalty of 0.25 may be applied. Any value may be used. The time match metric calculator 225 then determines if another time slot is to be compared (block 514). If another time slot is to be compared (block 514: YES), the time match metric calculator 225 identifies the dominant station tuned to by each device during the time slot to be compared (block 508).

If both devices are powered on, that is if both devices are not powered off during a time slot (block 510: NO) and only one of the devices is not powered off during a time slot (block 515: NO), the time match metric calculator 225 determines if the stations match (block 517). For example, the time match metric calculator 225 determines if the dominant station tuned to by the first device during the time slot is the same as the dominant station tuned to by the second device during the time slot. If the stations tuned by the pair of devices match during a time slot (block 517: YES), the time match metric calculator 225 does not assign a penalty (e.g., penalty=0) (block 518). The time match metric calculator 225 then determines if another time slot is to be compared (block 514). If another time slot is to be compared (block 514: YES), the time match metric calculator 225 identifies the dominant station tuned to by each device during the time slot to be compared (block 508).

If the time match metric calculator 225 determines that the stations do not match (block 517: NO), the time match metric calculator 225 assigns a third penalty (block 520). For example, a penalty of 1 may be applied. Any value may be used. In some examples, the stations do not match because the dominant station tuned to by one device is different than the dominant station tuned to by another device. In some examples, one penalty value is assigned when one device is powered off and the other device is powered on, and a different penalty value is assigned when the stations do not match because the respective dominant stations tuned to by the respective devices are not the same (i.e., do not match).

The time match metric calculator 225 determines if another time slot is to be compared (block 514). If another time slot is not to be compared (block 514: NO), the time match metric calculator 225 computes a difference score (block 522). For example, the time match metric calculator 225 sums the penalty values for all time slots over the given comparison duration, and divides by the number of timeslots to determine the time match metric for that pair of devices. The time match metric calculator 225 sets the difference score as the time match metric B (block 524). The time match metric B is used to identify if two devices are common devices as disclosed herein.

Figure 6:
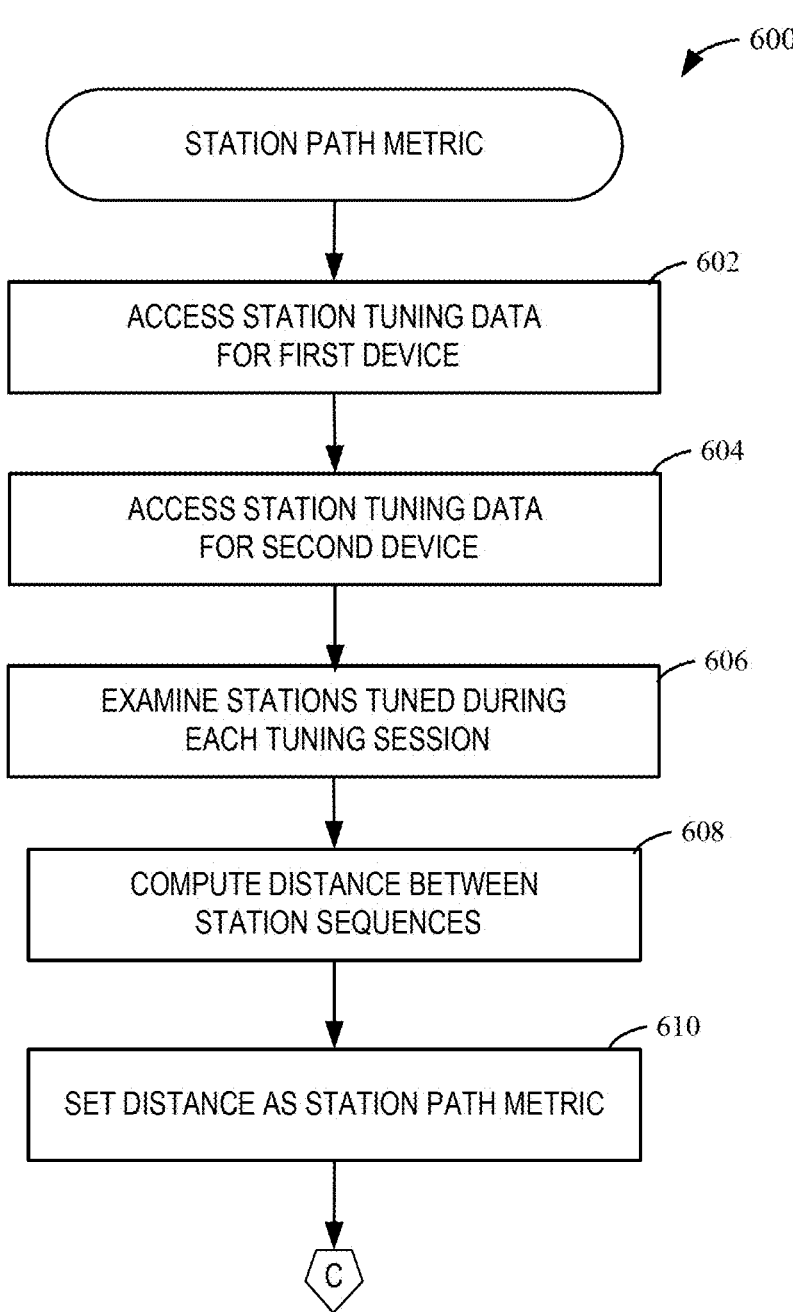

FIG. 6 illustrates an example procedure or program 600 to be performed by the station path metric calculator 230 to determine an example station path metric. The station path metric is used to compare a pair of media devices (e.g., one media device represented in the panelist audience measurement data with another media device represented in the census audience measurement data). The station path metric measures whether the two media devices being compared presented the same sequence of media.

In the illustrated example program 600, the station path metric calculator 230 accesses station tuning data for a first device (block 602) and accesses station tuning data for a second device (block 604). The station path metric calculator 230 examines the stations tuned to during each tuning session for the devices (block 606). The station path metric calculator 230 computes a distance between the sequence of stations tuned by the first device and the sequence of stations tuned by the second device (block 608). For example, the station path metric calculator 230 computes an edit distance over a comparison duration (e.g., one week for the first pass, six weeks for the second pass). The edit distance counts the number of changes or operations that would be needed for the sequence tuned by the first device to match the sequence tuned by the second device. In some examples, the station path metric calculator 230 utilizes a Levenshtein distance calculation such as, for example, Equation (5), to compute the distance. The distance calculation is normalized by the lengths of the tuning sequences of both devices. The station path metric calculator 230 sets the distance as the station path metric C for the pair of devices being compared (block 610). The station path metric C is used to identify if two devices are common devices as disclosed herein.

Figure 7:
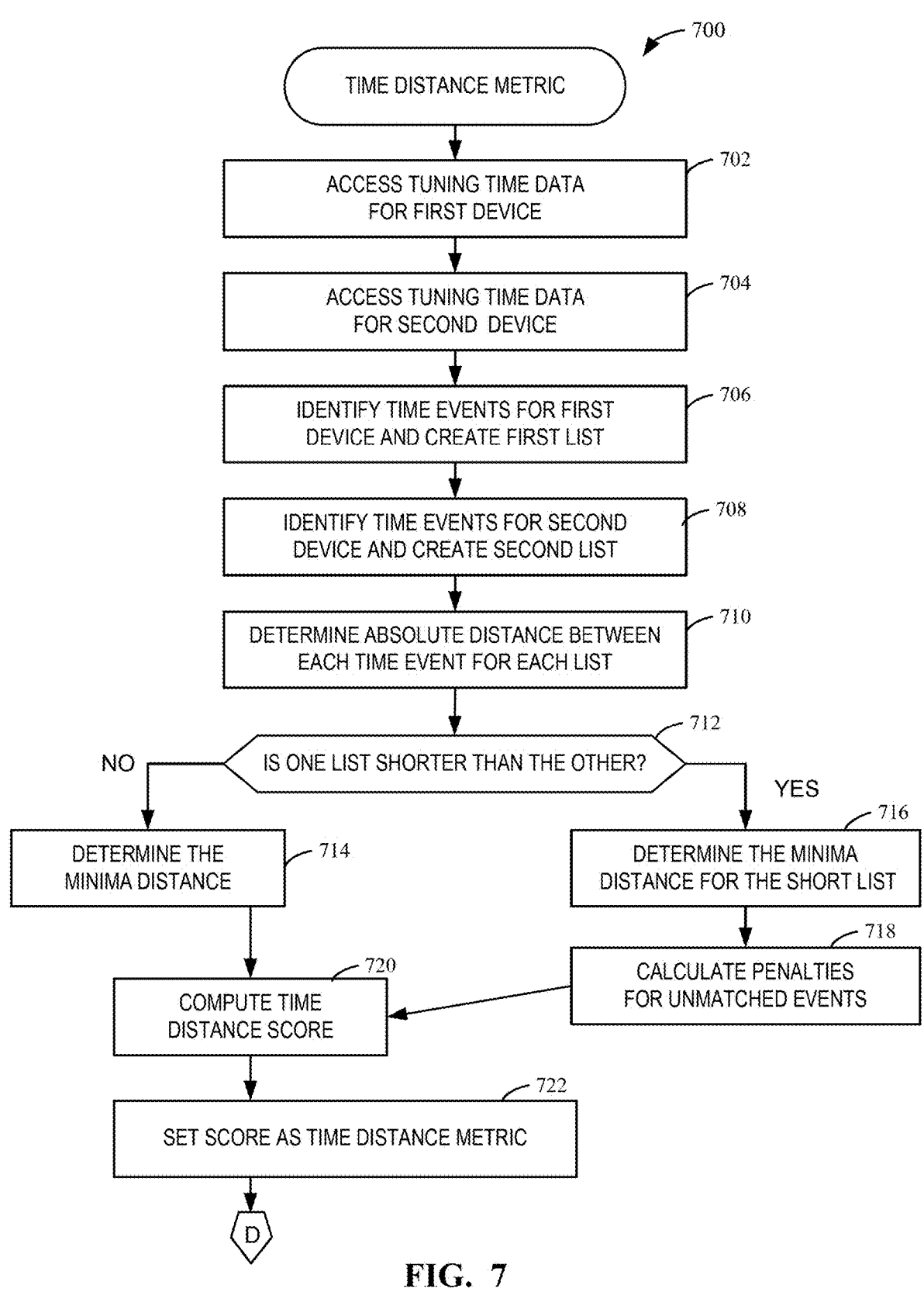

FIG. 7 illustrates an example procedure or program 700 to be performed by the time distance metric calculator 233 to determine an example time distance metric. The time distance metric is used to compare how similar the start and/or end times of tuning sessions or tuning activities are between two devices. The time distance metric measures whether the two devices being compared had tuning events at the same times or how closely in time.

In the illustrated example program 700, time distance metric calculator 233 accesses tuning time data for a first device (block 702). The time distance metric calculator 233 accesses tuning time data for a second device (block 704). The time distance metric calculator 233 identifies time events from the first device based on the tuning time data of the first device and creates a first list of time events (block 706). The time distance metric calculator 233 identifies time events from the second device based on the tuning time data of the second device and creates a second list of time events (block 708). The time distance metric calculator 233 determines the absolute distance between each time event for each device (block 710). For example, the time distance metric calculator 233 creates an array using the first list and the second list. The time distance metric calculator 233 fills in the array by calculating the distance between a time event of the first device and a time event of the second device.

The time distance metric calculator 233 determines if the first list is shorter than the second list or if the second list is shorter than the first list (block 712). If the first and second lists are the same length (block 712: NO), the time distance metric calculator 233 determines the minima distance (block 714). The minima distance is a list of the respective minimum distance from each event on one list to an event on the other list. If the time distance metric calculator 233 determines that one of the first list or the second list is shorter than the other (block 712: YES), the time distance metric calculator 233 determines the minima distance for the short list (Block 716). That is, the time distance metric calculator 233 determines a list of the minimum distance from each event in the short list to an event in the long list.

Because the long list has more event than the short list, there will be events in the long list that are not matched to the events in the short list when the time distance metric calculator 233 determines the minima distance for the short list. The time distance metric calculator 233 calculates a penalty for each event in the long list that is unmatched to an event in the short list (block 718). In other words, events in the long list that are too far in distance from events in the short list are assigned a penalty. The time distance metric calculator 233 computes a time distance score (block 720). The time distance score is based on the minima distance and any penalties. For example, the time distance metric calculator 233 may compute the time distance score using Equation (6).

The time distance metric calculator 233 sets the distance as the time distance metric D for the pair of devices being compared (block 722). The time distance metric D is used to identify if two devices are common devices as disclosed herein.

Figure 8:
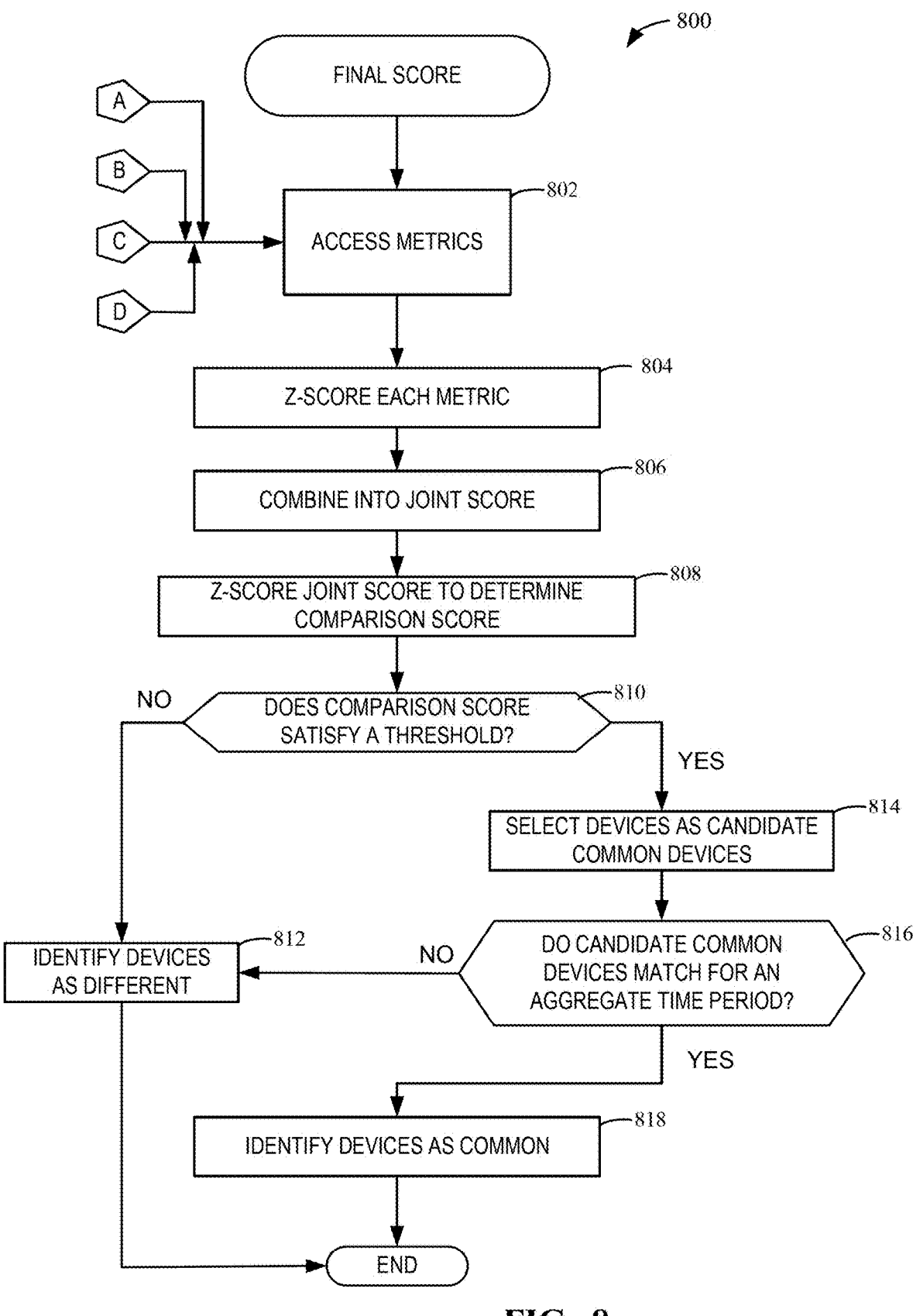

FIG. 8 illustrates an example procedure or program 800 to be performed by the comparison scorer 235 and the common device selector 240. In the example program 800, the comparison scorer 235 accesses the metrics (block 802). For example, the comparison scorer 235 access the station duration metric A, the time match metric B, the station path metric C, and the time distance metric D. The comparison scorer 235 computes the z-scores of the station duration metric A, the time match metric B, the station path metric C, and the time distance metric D for each pair of media devices being compared (block 804). The comparison scorer 235 combines (e.g., sums) the z-scores for each pair of media devices into a joint score (block 806). The comparison scorer 235 computes the z-scores of the joint scores to determine a final comparison score for each pair of media devices being compared (block 808).

The common device selector 240 determines if the resulting comparison score satisfies a threshold (block 810). For example, the common device selector 240 determines if four times the standard deviation of the comparison score is less than the mean comparison score. If the common device selector 240 determines that the comparison score does not satisfy the threshold (block 810: NO), the common device selector 240 determines, selectors or identifies the devices as different (block 812). That is, the common device selector 240 identifies the devices as not common devices when the comparison score does not satisfy a threshold.

If the common device selector 240 determines that the comparison score does satisfy the threshold (block 810: YES), the common device selector 240 selects the devices as candidate common devices (block 814). The common device selector 240 then determines if the candidate common devices have matched for an aggregate time period (block 816). That is, the common device selector 240 determines if a comparison score for the devices has satisfied a threshold for an aggregate of multiple time periods. In other words, the example program 800 is performed using metrics for a first time period, and the example program 800 is performed using metrics for a second time period. The two time periods could be, for example, one week for a first pass (e.g., the first time period) and six weeks for a second pass (e.g., the second time period). The second time period of, in this example, six weeks, could be an aggregate of analysis and scorings for each week in the six weeks. Testing or determining the matching of two devices with scores aggregated over time periods enhances confidence that the two devices are common devices.

If the common device selector 240 determines that the candidate common devices have not matched for two time periods (block 816: NO), the common device selector 240 identifies the devices as different (block 812). In other words, if the common device selector 240 determines that the comparison score for two devices satisfies a threshold for one time period but does not satisfy the threshold for another time period, the common device selector 240 identifies the two devices as not common or different devices.

If the common device selector 240 determines that the candidate common devices have matches for two time periods (block 816: YES), the common device selector 240 determines, selects, or identifies the candidate common devices as common devices (block 818). In other words, if the common device selector 240 determines that the comparison score for two devices satisfies a threshold for two time periods, the common device selector 240 identifies the two devices as common devices. The common device selector 240 identifying the two devices as common device (block 818) and the examples programs 400, 500, 600, 700, and 800 may implement the identification of common devices (block 314) of the example program 300 of FIG. 3.

Figure 9:
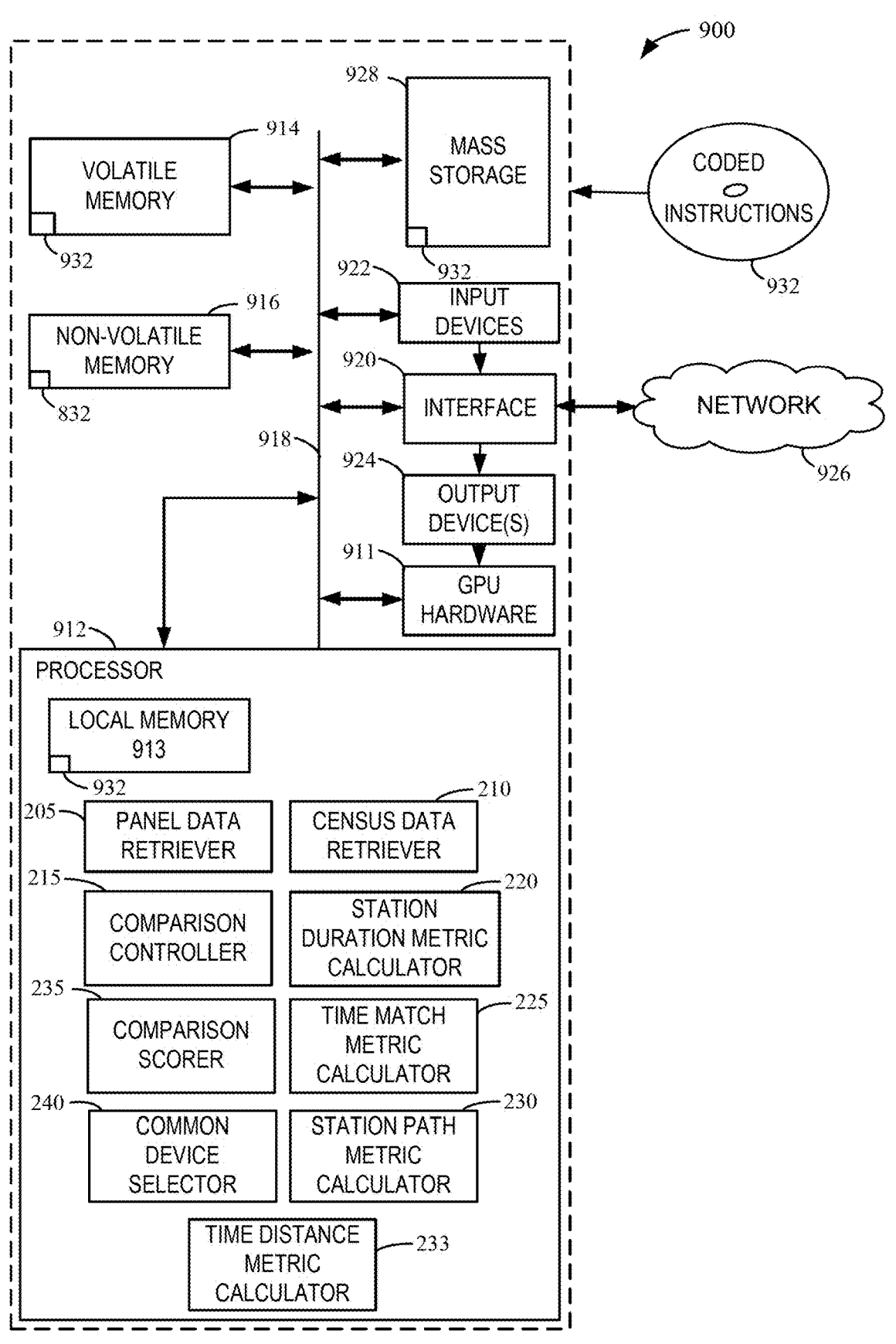
FIG. 9 is a block diagram of an example processor platform structured to execute the example machine readable instructions of FIGS. 3-8 to implement the example common device identification system of FIG. 2.

FIG. 9 is a block diagram of an example processor platform 900 structured to execute the instructions of FIGS. 3-8 to implement the common device identification system 200 of FIG. 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the panel data retriever 205, the census data retriever 210, the comparison controller 215, the station duration metric calculator 220, the time match metric calculator 225, the station path metric calculator 230, the time distance metric calculator 233, the comparison scorer 235, the common device selector 240, and/or the common device identification system 200.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device (s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 3-8 may be stored in the mass storage device 928, in the volatile memory 914, in the non-volatile memory 916, and/or on a removable non-transitory computer readable storage medium such as a CD or DVD.

Examples disclosed herein enable deduplication across multiple different data sources to identify common devices represented in the data in those data sources and, therefore, to identify redundant or duplicative data. Deduplication facilitates the avoidance of double counting of an audience member in the final audience measurement or ratings data. The deduplication results in more accurate audience measurement data. The examples disclosed herein also facilitate the aggregation of data across multiple datasets, which can be used to supplement data missing or corrupted in one or more other data sources. Thus, the examples disclosed herein improve the completeness and accuracy of databases.

Example methods, apparatus, systems and articles of manufacture (e.g., physical storage media) to deduplicate common devices across multiple data sources are disclosed. Example 1 includes a system to deduplicate common devices across multiple data sources, the system comprising: a comparison controller to identify a first device in a first data source and a second device in a second data source as a possible common device; a first metric calculator to calculate a station duration metric based on first station duration data and second station duration data, the first station duration data associated with a first set of durations of time that the first device tuned to a first set of stations, the second station duration data associated with a second set of durations of time that the second device tuned to the first set of stations; a second metric calculator to calculate a time match metric based on first time data and second time data, the first time data associated with a first set of times of day that the first device tuned to a second set of stations, the second time data associated with a second set of times of day that the second device tuned to the second set of stations, the first set of times of day overlapping with the second set of times of day; a third metric calculator to calculate a station path metric based on a first sequence of stations tuned to by the first device and a second sequence of stations tuned to by the second device; a comparison scorer to determine a joint score based on the station duration metric, the time match metric, and the station path metric; and a common device selector to determine when the first device and the second device are a common device based on the joint score.

Example 2 includes the system of Example 1, wherein the first set of stations and the second set of stations at least partially overlap.

Example 3 includes the system of Examples 1 or 2, wherein the comparison controller is to apply a restriction to first data from the first data source and second data from the second data source before the comparison controller is to identify the first device and the second device as the possible common device.

Example 4 includes the system of Example 3, wherein the restriction is a geographic restriction.

Example 5 includes the system of any of Examples 1-4, wherein the first metric calculator is to: calculate a first station duration, $q_i$:

$$q_i = \log_{10}(\text{ith channel duration for device 1});$$

calculate a second station duration, $p_i$:

$$p_i = \log_{10}(\text{ith channel duration for device 2})$$

calculate a normalized distance score by:

$$d(p, q) = d(q, p) \sqrt{\sum_{i=1}^{n} (q_i - p_i)^2}$$

$$\frac{d(p, q)}{N^{0.75}}$$

where N is a number of stations; and set the normalized distance score as the station duration metric.

Example 6 includes the system of any of Examples 1-5, wherein the second metric calculator is to: divide the first set of times of day and the second set of times of day into time slots; identify a first dominant station tuned to by the first device in a first time slot of the time slots; identify a second dominant station tuned to by the second device in the first time slot; perform a first comparison of the first dominant station and the second dominant station; calculate a first penalty based on the first comparison; identify a third dominant station tuned to by the first device in a second time slot of the time slots; identify a fourth dominant station tuned to by the second device in the second time slot; perform a second comparison of the third dominant station and the fourth dominant station; calculate a second penalty based on the second comparison; add the first penalty and the second penalty to compute a difference score; and set the difference score as the time match metric.

Example 7 includes the system of Example 6, wherein the second metric calculator is to: set the first penalty at a first value when at least one of: (1) data for the first time slot is missing for at least one of the first device or the second device, or (2) at least one of the first device or the second device is powered off for the first time slot; and set the first penalty at a second value when the first device and the second device are tuned to different stations during the first time slot, the second value greater than the first value.

Example 8 includes the system of any of Examples 1-7, wherein the third metric calculator is to: determine a number of operations needed to transform the second sequence into the first sequence; and determine the station path metric based on the number of operations.

Example 9 includes the system of Example 8, wherein the third metric calculator is to compute a Levenshtein distance to determine the number of operations.

Example 10 includes the system of any of Examples 1-9, wherein the comparison scorer is to: z-score the station duration metric; z-score the time match metric; z-score the station path metric; and determine the joint score based on a combination of the z-score of the station duration metric, the z-score of the time match metric; and the z-score of the station path metric.

Example 11 includes the system of any of Examples 1-10, wherein the common device selector is to determine that the first device and the second device are a common device when the joint score satisfies a threshold.

Example 12 includes the system of Example 11, wherein the threshold is satisfied when four times a standard deviation of the joint score is less than a mean of the joint score.

Example 13 includes the system of Example 11, wherein the first station duration data, the second station duration data, the first time data, the second time data, the first sequence of stations, and the second sequence of stations are associated with a first time interval, wherein the station duration metric is a first station duration metric, the time match metric is a first time match metric, the station path metric is a first station path metric, the joint score is a first joint score, the first metric calculator to calculate a second station duration metric based on third station duration data and fourth station duration data associated with a second time interval; the second metric calculator to calculate a second time match metric based on third time data and fourth time data associated with the second time internal; the third metric calculator to calculate a second station path metric based on a third sequence of stations tuned to by the first device and a fourth sequence of stations tuned to by the second device, the third sequence and fourth sequence associated with the second time interval; the comparison scorer to determine a second joint score based on the second station duration metric, the second time match metric, and second the station path metric; and the common device selector to determine when the first device and the second device are a common device based on the second joint score satisfying the threshold.

Example 14 includes the system of any of Examples 1-13, further including a fourth metric calculator to calculate a time distance metric based on a first set of time events of activity of the first device and a second set of time events of the second device, the comparison scorer to determine the joint score based on the time distance metric.

Example 15 includes a system to deduplicate common devices across multiple data sources, the system comprising: means for identifying a first device in a first data source and a second device in a second data source as a possible common device; means for calculating a station duration metric based on first station duration data and second station duration data, the first station duration data associated with a first set of durations of time that the first device tuned to a first set of stations, the second station duration data associated with a second set of durations of time that the second device tuned to the first set of stations; means for calculating a time match metric based on first time data and second time data, the first time data associated with a first set of times of day that the first device tuned to a second set of stations, the second time data associated with a second set of times of day that the second device tuned to the second set of stations, the first set of times of day overlapping with the second set of times of day; means for calculating a station path metric based on a first sequence of stations tuned to by the first device and a second sequence of stations tuned to by the second device; means for determining a joint score based on the station duration metric, the time match metric, and the station path metric; and means for selecting when the first device and the second device are a common device based on the joint score.

Example 16 includes the system of Example 15, wherein the first set of stations and the second set of stations at least partially overlap.

Example 17 includes the system of Examples 15 or 16, wherein the means for identifying is to apply a restriction to first data from the first data source and second data from the second data source before the first device and the second device are identified as the possible common device.

Example 18 includes the system of Example 17, wherein the restriction is a geographic restriction.

Example 19 includes the system of any of Examples 15-18, wherein the means for calculating the station duration metric is to:

calculate a first station duration, $q_i$:

$$q_i = \log_{10}(\text{ith channel duration for device 1});$$

calculate a second station duration, $p_i$:

$$p_i = \log_{10}(\text{ith channel duration for device 2})$$

calculate a normalized distance score by:

$$d(p, q) = d(q, p) \sqrt{\sum_{i=1}^{n} (q_i - p_i)^2}$$

$$\frac{d(p, q)}{N^{0.75}}$$

where N is a number of stations; and set the normalized distance score as the station duration metric.

Example 20 includes the system of any of Examples 15-19, wherein the means for calculating the time match metric is to: divide the first set of times of day and the second set of times of day into time slots; identify a first dominant station tuned to by the first device in a first time slot of the time slots; identify a second dominant station tuned to by the second device in the first time slot; perform a first comparison of the first dominant station and the second dominant station; calculate a first penalty based on the first comparison; identify a third dominant station tuned to by the first device in a second time slot of the time slots; identify a fourth dominant station tuned to by the second device in the second time slot; perform a second comparison of the third dominant station and the fourth dominant station; calculate a second penalty based on the second comparison; add the first penalty and the second penalty to compute a difference score; and set the difference score as the time match metric.

Example 21 includes the system of Example 20, wherein the means for calculating a time match metric is to: set the first penalty at a first value when at least one of: (1) data for the first time slot is missing for at least one of the first device or the second device, or (2) at least one of the first device or the second device is powered off for the first time slot; and set the first penalty at a second value when the first device and the second device are tuned to different stations during the first time slot, the second value greater than the first value.

Example 22 includes the system of any of Examples 15-21, wherein the means for calculating a station path metric is to: determine a number of operations needed to transform the second sequence into the first sequence; and determine the station path metric based on the number of operations.

Example 23 includes the system of Example 22, wherein the means for calculating a station path metric is to compute a Levenshtein distance to determine the number of operations.

Example 24 includes the system of any of Examples 15-23, wherein the means for determining a joint score is to: z-score the station duration metric; z-score the time match metric; z-score the station path metric; and determine the joint score based on a combination of the z-score of the station duration metric, the z-score of the time match metric; and the z-score of the station path metric.

Example 25 includes the system of any of Examples 15-24, wherein the means for selecting is to determine that the first device and the second device are a common device when the joint score satisfies a threshold.

Example 26 includes the system of Example 25, wherein the threshold is satisfied when four times a standard deviation of the joint score is less than a mean of the joint score.

Example 27 includes the system of Example 25, wherein the first station duration data, the second station duration data, the first time data, the second time data, the first sequence of stations, and the second sequence of stations are associated with a first time interval, wherein the station duration metric is a first station duration metric, the time match metric is a first time match metric, the station path metric is a first station path metric, the joint score is a first joint score, the means for calculating a station duration metric is to calculate a second station duration metric based on third station duration data and fourth station duration data associated with a second time interval; the means for calculating a time match metric is to calculate a second time match metric based on third time data and fourth time data associated with the second time interval; the means for calculating a station path metric is to calculate a second station path metric based on a third sequence of stations tuned to by the first device and a fourth sequence of stations tuned to by the second device, the third sequence and fourth sequence associated with the second time interval; the means for determining a joint score is to determine a second joint score based on the second station duration metric, the second time match metric, and second the station path metric; and the means for selecting is to determine when the first device and the second device are a common device based on the second joint score satisfying the threshold.

Example 28 includes the system of any of Examples 15-27, further including means for calculating a time distance metric based on a first set of time events of activity of the first device and a second set of time events of the second device, the means for determining a joint score to determine the joint score based on the time distance metric.

Example 29 includes an apparatus to deduplicate common devices across multiple data sources, the apparatus comprising: processor circuitry; and a memory including instructions which, when executed, cause the processor circuitry to: identify a first device in a first data source and a second device in a second data source as a possible common device; calculate a station duration metric based on first station duration data and second station duration data, the first station duration data associated with a first set of durations of time that the first device tuned to a first set of stations, the second station duration data associated with a second set of durations of time that the second device tuned to the first set of stations; calculate a time match metric based on first time data and second time data, the first time data associated with a first set of times of day that the first device tuned to a second set of stations, the second time data associated with a second set of times of day that the second device tuned to the second set of stations, the first set of times of day overlapping with the second set of times of day; calculate a station path metric based on a first sequence of stations tuned to by the first device and a second sequence of stations tuned to by the second device; determine a joint score based on the station duration metric, the time match metric, and the station path metric; and determine when the first device and the second device are a common device based on the joint score.

Example 30 includes the apparatus of Example 29, wherein the first set of stations and the second set of stations at least partially overlap.

Example 31 includes the apparatus of Examples 29 or 30, wherein the instructions cause the processing circuitry to apply a restriction to first data from the first data source and second data from the second data source before the first device and the second device are identified as the possible common device.

Example 32 includes the apparatus of Example 31, wherein the restriction is a geographic restriction.

Example 33 includes the apparatus of any of Examples 29-32, wherein the instructions cause the processing circuitry to:

calculate a first station duration, $q_i$:

$q_i = \log_{10}(\text{ith channel duration for device 1})$;

calculate a second station duration, $p_i$:

$p_i = \log_{10}(\text{ith channel duration for device 2})$ calculate a normalized distance score by:

$$d(p, q) = d(q, p) \sqrt{\sum_{i=1}^{n}(q_i - p_i)^2}$$

$$\frac{d(p, q)}{N^{0.75}}$$

where N is a number of stations; and set the normalized distance score as the station duration metric.

Example 34 includes the apparatus of any of Examples 29-33, wherein the instructions cause the processing circuitry to: divide the first set of times of day and the second set of times of day into time slots; identify a first dominant station tuned to by the first device in a first time slot of the time slots; identify a second dominant station tuned to by the second device in the first time slot; perform a first comparison of the first dominant station and the second dominant station; calculate a first penalty based on the first comparison; identify a third dominant station tuned to by the first device in a second time slot of the time slots; identify a fourth dominant station tuned to by the second device in the second time slot; perform a second comparison of the third dominant station and the fourth dominant station; calculate a second penalty based on the second comparison; add the first penalty and the second penalty to compute a difference score; and set the difference score as the time match metric.

Example 35 includes the apparatus of Example 33 includes the apparatus of any of Examples 29-32, The apparatus of Example 34, wherein the instructions cause the processing circuitry to: set the first penalty at a first value when at least one of: (1) data for the first time slot is missing for at least one of the first device or the second device, or (2) at least one of the first device or the second device is powered off for the first time slot; and set the first penalty at a second value when the first device and the second device are tuned to different stations during the first time slot, the second value greater than the first value.

Example 36 includes the apparatus of any of Examples 29-35, wherein the instructions cause the processing circuitry to: determine a number of operations needed to transform the second sequence into the first sequence; and determine the station path metric based on the number of operations.

Example 37 includes the apparatus of Example 36, wherein the instructions cause the processing circuitry to compute a Levenshtein distance to determine the number of operations.

Example 38 includes the apparatus of any of Examples 29-37, The apparatus of Example 29, wherein the instructions cause the processing circuitry to: z-score the station duration metric; z-score the time match metric; z-score the station path metric; and determine the joint score based on a combination of the z-score of the station duration metric, the z-score of the time match metric; and the z-score of the station path metric.

Example 39 includes the apparatus of any of Examples 29-38, wherein the instructions cause the processing circuitry to determine that the first device and the second device are a common device when the joint score satisfies a threshold.

Example 40 includes the apparatus of Example 39, wherein the threshold is satisfied when four times a standard deviation of the joint score is less than a mean of the joint score.

Example 41 includes the apparatus of Example 39, wherein the first station duration data, the second station duration data, the first time data, the second time data, the first sequence of stations, and the second sequence of stations are associated with a first time interval, wherein the station duration metric is a first station duration metric, the time match metric is a first time match metric, the station path metric is a first station path metric, the joint score is a first joint score, and the instructions cause the processing circuitry to: calculate a second station duration metric based on third station duration data and fourth station duration data associated with a second time interval; calculate a second time match metric based on third time data and fourth time data associated with the second time inter-nal; calculate a second station path metric based on a third sequence of stations tuned to by the first device and a fourth sequence of stations tuned to by the second device, the third sequence and fourth sequence associ-ated with the second time interval; determine a second joint score based on the second station duration metric, the second time match metric, and second the station path metric; and determine when the first device and the second device are a common device based on the second joint score satisfying the threshold.

Example 42 includes the apparatus of any of Examples 29-41, The apparatus of Example 29, wherein the instructions cause the processing circuitry to: calculate a time distance metric based on a first set of time events of activity of the first device and a second set of time events of the second device; and determine the joint score based on the time distance metric.

Example 43 includes a non-transitory computer readable storage medium comprising instructions which, when executed, cause one or more processors to at least: identify a first device in a first data source and a second device in a second data source as a possible common device; calculate a station duration metric based on first station duration data and second station duration data, the first station duration data associated with a first set of durations of time that the first device tuned to a first set of stations, the second station duration data associated with a second set of durations of time that the second device tuned to the first set of stations; calculate a time match metric based on first time data and second time data, the first time data associated with a first set of times of day that the first device tuned to a second set of stations, the second time data associated with a second set of times of day that the second device tuned to the second set of stations, the first set of times of day overlapping with the second set of times of day; calculate a station path metric based on a first sequence of stations tuned to by the first device and a second sequence of stations tuned to by the second device; determine a joint score based on the station duration metric, the time match metric, and the station path metric; and determine when the first device and the second device are a common device based on the joint score.

Example 44 includes the storage medium of Example 43, wherein the first set of stations and the second set of stations at least partially overlap.

Example 45 includes the storage medium of Examples 43 or 44, wherein the instructions cause the one or more processors to apply a restriction to first data from the first data source and second data from the second data source before the comparison controller is to identify the first device and the second device as the possible common device.

Example 46 includes the storage medium of Example 45, wherein the restriction is a geographic restriction.

Example 47 includes the storage medium of any of Examples 43-45, wherein the instructions cause the one or more processors to:

calculate a first station duration, $q_i$:

$q_i = \log_{10}(\text{ith channel duration for device 1});$ calculate a second station duration, $p_i$:

$p_i = \log_{10}(\text{ith channel duration for device 2})$ calculate a normalized distance score by:

$$d(p, q) = d(q, p) \sqrt{\sum_{i=1}^{n}(q_i - p_i)^2}$$

$$\frac{d(p, q)}{N^{0.75}}$$

where N is a number of stations; and set the normalized distance score as the station duration metric.

Example 48 includes the storage medium of any of Examples 43-47, wherein the instructions cause the one or more processors to: divide the first set of times of day and the second set of times of day into time slots; identify a first dominant station tuned to by the first device in a first time slot of the time slots; identify a second dominant station tuned to by the second device in the first time slot; perform a first comparison of the first dominant station and the second dominant station; calculate a first penalty based on the first comparison; identify a third dominant station tuned to by the first device in a second time slot of the time slots; identify a fourth dominant station tuned to by the second device in the second time slot; perform a second comparison of the third dominant station and the fourth dominant station; calculate a second penalty based on the second comparison; add the first penalty and the second penalty to compute a difference score; and set the difference score as the time match metric.

Example 49 includes the storage medium of Example 48, wherein the instructions cause the one or more processors to: set the first penalty at a first value when at least one of: (1) data for the first time slot is missing for at least one of the first device or the second device, or (2) at least one of the first device or the second device is powered off for the first time slot; and set the first penalty at a second value when the first device and the second device are tuned to different stations during first time slot, the second value greater than the first value.

Example 50 includes the storage medium of any of Examples 43-49, wherein the instructions cause the one or more processors to: determine a number of operations needed to transform the second sequence into the first sequence; and determine the station path metric based on the number of operations.

Example 51 includes the storage medium of Example 50, wherein the instructions cause the one or more processors to compute a Levenshtein distance to determine the number of operations.

Example 52 includes the storage medium of any of Examples 43-51, wherein the instructions cause the one or more processors to: z-score the station duration metric; z-score the time match metric; z-score the station path metric; and determine the joint score based on a combination of the z-score of the station duration metric, the z-score of the time match metric; and the z-score of the station path metric.

Example 53 includes the storage medium of any of Examples 43-52, wherein the instructions cause the one or more processors to determine that the first device and the second device are a common device when the joint score satisfies a threshold.

Example 54 includes the storage medium of Example 53, wherein the threshold is satisfied when four times a standard deviation of the joint score is less than a mean of the joint score.

Example 55 includes the storage medium of Example 53, wherein the first station duration data, the second station duration data, the first time data, the second time data, the first sequence of stations, and the second sequence of stations are associated with a first time interval, wherein the station duration metric is a first station duration metric, the time match metric is a first time match metric, the station path metric is a first station path metric, the joint score is a first joint score, and the instructions cause the one or more processors to: calculate a second station duration metric based on third station duration data and fourth station duration data associated with a second time interval; calculate a second time match metric based on third time data and fourth time data associated with the second time internal; calculate a second station path metric based on a third sequence of stations tuned to by the first device and a fourth sequence of stations tuned to by the second device, the third sequence and fourth sequence associated with the second time interval; determine a second joint score based on the second station duration metric, the second time match metric, and second the station path metric; and determine when the first device and the second device are a common device based on the second joint score satisfying the threshold.

Example 56 includes the storage medium of any of Examples 43-55, wherein the instructions cause the one or more processors to: calculate a time distance metric based on a first set of time events of activity of the first device and a second set of time events of the second device; and determine the joint score based on the time distance metric.

Example 57 includes a method to deduplicate common devices across multiple data sources, the method comprising: identifying, by executing an instruction with a processor, a first device in a first data source and a second device in a second data source as a possible common device; calculating, by executing an instruction with the processor, a station duration metric based on first station duration data and second station duration data, the first station duration data associated with a first set of durations of time that the first device tuned to a first set of stations, the second station duration data associated with a second set of durations of time that the second device tuned to the first set of stations; calculating, by executing an instruction with the processor, a time match metric based on first time data and second time data, the first time data associated with a first set of times of day that the first device tuned to a second set of stations, the second time data associated with a second set of times of day that the second device tuned to the second set of stations, the first set of times of day overlapping with the second set of times of day; calculating, by executing an instruction with the processor, a station path metric based on a first sequence of stations tuned to by the first device and a second sequence of stations tuned to by the second device; determining, by executing an instruction with the processor, a joint score based on the station duration metric, the time match metric, and the station path metric; and determining, by executing an instruction with the processor, when the first device and the second device are a common device based on the joint score.

Example 58 includes the method of Example 57, wherein the first set of stations and the second set of stations at least partially overlap.

Example 59 includes the method of Examples 57 or 58, further including applying, by executing an instruction with the processor, a restriction to first data from the first data source and second data from the second data source before the comparison controller is to identify the first device and the second device as the possible common device.

Example 60 includes the method of Example 59, wherein the restriction is a geographic restriction.

Example 61 includes the method of any of Examples 57-60, further including:
calculating, by executing an instruction with the processor, a first station duration, $q_i$:

$q_i = \log_{10}(\text{ith channel duration for device 1});$ calculating, by executing an instruction with the processor, a second station duration, $p_i$:

$p_i = \log_{10}(\text{ith channel duration for device 2})$ calculating, by executing an instruction with the processor, a normalized distance score by:

$$d(p, q) = d(q, p)\sqrt{\sum_{i=1}^{n}(q_i - p_i)^2}$$

$$\frac{d(p, q)}{N^{0.75}}$$

where N is a number of stations; and setting, by executing an instruction with the processor, the normalized distance score as the station duration metric.

Example 62 includes the method of any of Examples 57-61, further including: dividing, by executing an instruction with the processor, the first set of times of day and the second set of times of day into time slots; identifying, by executing an instruction with the processor, a first dominant station tuned to by the first device in a first time slot of the time slots; identifying, by executing an instruction with the processor, a second dominant station tuned to by the second device in the first time slot; performing, by executing an instruction with the processor, a first comparison of the first dominant station and the second dominant station; calculating, by executing an instruction with the processor, a first penalty based on the first comparison; identifying, by executing an instruction with the processor, a third dominant station tuned to by the first device in a second time slot of the time slots; identifying, by executing an instruction with the processor, a fourth dominant station tuned to by the second device in the second time slot; performing, by executing an instruction with the processor, a second comparison of the third dominant station and the fourth dominant station; calculating, by executing an instruction with the processor, a second penalty based on the second comparison; adding, by executing an instruction with the processor, the first penalty and the second penalty to compute a difference score; and setting, by executing an instruction with the processor, the difference score as the time match metric.

Example 63 includes the method of Example 62, further including: setting, by executing an instruction with the processor, the first penalty at a first value when at least one of: (1) data for the first time slot is missing for at least one of the first device or the second device, or (2) at least one of the first device or the second device is powered off for the first time slot; and setting, by executing an instruction with the processor, the first penalty at a second value when the first device and the second device are tuned to different stations during the first time slot, the second value greater than the first value.

Example 64 includes the method of any of Examples 57-63, further including: determining, by executing an instruction with the processor, a number of operations needed to transform the second sequence into the first sequence; and determining, by executing an instruction with the processor, the station path metric based on the number of operations.

Example 65 includes the method of Example 64, further including computing, by executing an instruction with the processor, a Levenshtein distance to determine the number of operations.

Example 66 includes the method of any of Examples 57-65, and further including z-scoring, by executing an instruction with the processor, the station duration metric; z-scoring, by executing an instruction with the processor, the time match metric; z-scoring, by executing an instruction with the processor, the station path metric; and determining, by executing an instruction with the processor, the joint score based on a combination of the z-score of the station duration metric, the z-score of the time match metric; and the z-score of the station path metric.

Example 67 includes the method of any of Examples 57-66, The method of Example 57, further including determining, by executing an instruction with the processor, that the first device and the second device are a common device when the joint score satisfies a threshold.

Example 68 includes the method of Example 67, wherein the threshold is satisfied when four times a standard deviation of the joint score is less than a mean of the joint score.

Example 69 includes the method of Example 67, wherein the first station duration data, the second station duration data, the first time data, the second time data, the first sequence of stations, and the second sequence of stations are associated with a first time interval, wherein the station duration metric is a first station duration metric, the time match metric is a first time match metric, the station path metric is a first station path metric, the joint score is a first joint score, and the method further including: calculating, by executing an instruction with the processor, a second station duration metric based on third station duration data and fourth station duration data associated with a second time interval; calculating, by executing an instruction with the processor, a second time match metric based on third time data and fourth time data associated with the second time internal; calculating, by executing an instruction with the processor, a second station path metric based on a third sequence of stations tuned to by the first device and a fourth sequence of stations tuned to by the second device, the third sequence and fourth sequence associated with the second time interval; determining, by executing an instruction with the processor, a second joint score based on the second station duration metric, the second time match metric, and second the station path metric; and determining, by executing an instruction with the processor, when the first device and the second device are a common device based on the second joint score satisfying the threshold.

Example 70 includes the method of any of Examples 57-69, further including: calculating, by executing an instruction with processor, a time distance metric based on a first set of time events of activity of the first device and a second set of time events of the second device, the joint score based on the time distance metric.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:

a processor; and at least one memory storing instructions that, when executed by the processor, cause the system to perform operations comprising:

receiving, via first network communications with one or more computing devices, a first set of data obtained by first meter devices;

receiving, via second network communications with the one or more computing devices, a second set of data obtained by second meter devices;

determining whether to apply a restriction to the first set of data obtained by the first meter devices and the second set of data obtained by the second meter devices;

based on determining to apply the restriction, applying the restriction to the first set of data to select a first subset of data, and to the second set of data to select a second subset of data, wherein the first subset of data and the second subset of data each represent a smaller number of media presentation devices than each of the first set of data and the second set of data;

processing the first subset of data and the second subset of data to identify a first media presentation device represented by the first subset of data and a second media presentation device represented by the second subset of data as a possible common media presentation device;

calculating at least one of a station duration metric, a time match metric or a station path metric, wherein:

i) the station duration metric is based on a first set of durations of time that the first media presentation device tuned to a first set of stations and a second set of durations of time that the second media presentation device tuned to the first set of stations, ii) the time match metric is based on a first set of times of day that the first media presentation device tuned to a second set of stations and a second set of times of day that the second media presentation device tuned to the second set of stations, and iii) the station path metric based on a first sequence of stations tuned to by the first media presentation device and a second sequence of stations tuned to by the second media presentation device;

determining a score based on the at least one of the station duration metric, the time match metric, or the station path metric; and determining that the first media presentation device and the second media presentation device are a common media presentation device based on the score.

2. The system of claim 1, wherein the operations further comprise:

processing the first set of data by removing data corresponding to the common media presentation device to generate a final data set; and storing, in the at least one memory, the final data set as deduplicated audience measurement data.

3. The system of claim 1, wherein the restriction to the first set of data obtained by the first meter devices and the second set of data obtained by the second meter devices is based on respective physical locations of the first meter devices and the second meter devices.

4. The system of claim 3, wherein the respective physical locations comprise the same designated market area.

5. The system of claim 1, wherein the first set of stations and the second set of stations at least partially overlap.

6. The system of claim 1, wherein the operations further comprise:

calculating a first station duration, $q_i$:

$q_i = \log_{10}$ (ith channel duration for device 1);

calculating a second station duration, $p_i$:

$p_i = \log_{10}$ (ith channel duration for device 2)

calculating a normalized distance score by:

$$d(p, q) = d(q, p)\sqrt{\sum_{i=1}^{n}(q_i - p_i)^2}$$

$$\frac{d(p, q)}{N^{0.75}}$$

where N is a number of stations; and setting the normalized distance score as the station duration metric.

7. The system of claim 1, wherein the operations further comprise:

dividing the first set of times of day and the second set of times of day into time slots;

identifying a first dominant station tuned to by the first media presentation device in a first time slot of the time slots;

identifying a second dominant station tuned to by the second media presentation device in the first time slot;

performing a first comparison of the first dominant station and the second dominant station;

calculating a first penalty based on the first comparison;

identify a third dominant station tuned to by the first media presentation device in a second time slot of the time slots;

identifying a fourth dominant station tuned to by the second media presentation device in the second time slot;

performing a second comparison of the third dominant station and the fourth dominant station;

calculating a second penalty based on the second comparison;

adding the first penalty and the second penalty to compute a difference score; and setting the difference score as the time match metric.

8. The system of claim 7, wherein the operations further comprise:

setting the first penalty at a first value when at least one of: (i) data for the first time slot is missing for at least one of the first media presentation device or the second media presentation device, or (ii) at least one of the first media presentation device or the second media presentation device is powered off for the first time slot; and setting the first penalty at a second value when the first media presentation device and the second media presentation device are tuned to different stations during the first time slot, the second value greater than the first value.

9. The system of claim 1, wherein the operations further comprise:

determining a number of operations needed to transform the second sequence into the first sequence; and

determining the station path metric based on the number of operations.

10. The system of claim 9, wherein the operations further comprise:

computing a Levenshtein distance to determine the number of operations.

11. The system of claim 1, wherein the operations further comprise:

determining z-score of the station duration metric;

determining z-score of the time match metric;

determining z-score of the station path metric; and determining the score based on a combination of the z-score of the station duration metric, the z-score of the time match metric; and the z-score of the station path metric.

12. The system of claim 1, wherein the operations further comprise:

determining that the first media presentation device and the second media presentation device are a common media presentation device when the score satisfies a threshold.

13. The system of claim 12, wherein the threshold is satisfied when four times a standard deviation of the score is less than a mean of the score.

14. The system of claim 12, wherein the first set of durations of time are included in first station duration data, the second set of durations of time are included in second station duration data, the first set of times of day are included in first time data, the second set of times of day are included in second time data, and the first set of durations of time, the second set of durations of time, the first set of times of day, the second set of times of day the first sequence of stations, and the second sequence of stations are associated with a first time interval, wherein the station duration metric is a first station duration metric, the time match metric is a first time match metric, the station path metric is a first station path metric, the score is a first score, and wherein the operations further comprise:

calculating at least one of a second station duration metric based on third station duration data and fourth station duration data associated with a second time interval, a second time match metric based on third time data and fourth time data associated with the second time internal, or a second station path metric based on a third sequence of stations tuned to by the first media presentation device and a fourth sequence of stations tuned to by the second media presentation device, the third sequence and fourth sequence associated with the second time interval;

determining a second score based on the at least one of the second station duration metric, the second time match metric, or second the station path metric; and determining that the first media presentation device and the second media presentation device are the common media presentation device based on the second score satisfying the threshold.

15. The system of claim 1, wherein the operations further comprise:

calculating a time distance metric based on a first set of time events of activity of the first media presentation device and a second set of time events of the second media presentation device; and determining the score based on the time distance metric.

16. A non-transitory computer readable storage medium comprising instructions which, when executed, cause a processor to perform a set of operations comprising:

receiving, via first network communications with one or more computing devices, a first set of data obtained by first meter devices;

receiving, via second network communications with the one or more computing devices, a second set of data obtained by second meter devices;

determining whether to apply a restriction to the first set of data obtained by the first meter devices and the second set of data obtained by the second meter devices;

based on determining to apply the restriction, applying the restriction to the first set of data to select a first subset of data, and to the second set of data to select a second subset of data, wherein the first subset of data and the second subset of data each represent a smaller number of media presentation devices than each of the first set of data and the second set of data;

processing the first subset of data and the second subset of data to identify a first media presentation device represented by the first subset of data and a second media presentation device represented by the second subset of data as a possible common media presentation device;

calculating at least one of a station duration metric, a time match metric or a station path metric, wherein:

i) the station duration metric is based on a first set of durations of time that the first media presentation device tuned to a first set of stations and a second set of durations of time that the second media presentation device tuned to the first set of stations, ii) the time match metric is based on a first set of times of day that the first media presentation device tuned to a second set of stations and a second set of times of day that the second media presentation device tuned to the second set of stations, and iii) the station path metric based on a first sequence of stations tuned to by the first media presentation device and a second sequence of stations tuned to by the second media presentation device;

determining a score based on the at least one of the station duration metric, the time match metric, or the station path metric; and determining that the first media presentation device and the second media presentation device are a common media presentation device based on the score.

17. The non-transitory computer readable storage medium of claim 16, wherein the operations further comprise:

processing the first set of data by removing data corresponding to the common media presentation device to generate a final data set; and storing, in a memory, the final data set as deduplicated audience measurement data.

18. The non-transitory computer readable storage medium of claim 16, wherein the restriction to the first set of data obtained by the first meter devices and the second set of data obtained by the second meter devices is based on respective physical locations of the first meter devices and the second meter devices.

19. The non-transitory computer readable storage medium of claim 18, wherein the respective physical locations comprise the same designated market area.

20. A method comprising:

receiving, via first network communications with one or more computing devices, a first set of data obtained by first meter devices;

receiving, via second network communications with the one or more computing devices, a second set of data obtained by second meter devices;

determining whether to apply a restriction to the first set of data obtained by the first meter devices and the second set of data obtained by the second meter devices;

based on determining to apply the restriction, applying the restriction to the first set of data to select a first subset of data, and to the second set of data to select a second subset of data, wherein the first subset of data and the second subset of data each represent a smaller number of media presentation devices than each of the first set of data and the second set of data;

processing the first subset of data and the second subset of data to identify a first media presentation device represented by the first subset of data and a second media presentation device represented by the second subset of data as a possible common media presentation device;

calculating at least one of a station duration metric, a time match metric or a station path metric, wherein:

i) the station duration metric is based on a first set of durations of time that the first media presentation device tuned to a first set of stations and a second set of durations of time that the second media presentation device tuned to the first set of stations, ii) the time match metric is based on a first set of times of day that the first media presentation device tuned to a second set of stations and a second set of times of day that the second media presentation device tuned to the second set of stations, and iii) the station path metric based on a first sequence of stations tuned to by the first media presentation device and a second sequence of stations tuned to by the second media presentation device;

determining a score based on the at least one of the station duration metric, the time match metric, or the station path metric; and determining that the first media presentation device and the second media presentation device are a common media presentation device based on the score.

* * * * *